(12) United States Patent
Goetz et al.

(10) Patent No.: US 7,752,484 B2
(45) Date of Patent: Jul. 6, 2010

(54) ON-DEMAND WRAPPERS OF APPLICATION DATA WITH SESSION FAILOVER RECOVERY

(75) Inventors: Oliver Goetz, Altrip (DE); Bernhard Drabant, Muhlhausen (DE); Thomas Gauweiler, Speyer (DE)

(73) Assignee: SAP AG, Walldorf (DE)

( * ) Notice: Subject to any disclaimer, the term of this patent is extended or adjusted under 35 U.S.C. 154(b) by 784 days.

(21) Appl. No.: 11/639,834

(22) Filed: Dec. 15, 2006

(65) Prior Publication Data
US 2008/0155320 A1 Jun. 26, 2008

Related U.S. Application Data

(63) Continuation-in-part of application No. 11/585,533, filed on Oct. 24, 2006.

(51) Int. Cl.
*G06F 11/00* (2006.01)
(52) U.S. Cl. .............. 714/2; 719/315; 719/316; 719/320
(58) Field of Classification Search .......... 714/2, 714/15, 20; 719/315, 316, 320
See application file for complete search history.

(56) References Cited

U.S. PATENT DOCUMENTS

| | | | | |
|---|---|---|---|---|
| 5,768,587 A * | 6/1998 | Freund et al. | ................ | 718/101 |
| 5,826,258 A * | 10/1998 | Gupta et al. | ................... | 707/4 |
| 6,256,678 B1 * | 7/2001 | Traughber et al. | .......... | 719/310 |
| 7,082,553 B1 * | 7/2006 | Wang | .......................... | 714/38 |
| 7,082,607 B2 * | 7/2006 | Lake et al. | ................... | 718/107 |
| 2005/0027859 A1 * | 2/2005 | Alvisi et al. | ................. | 709/224 |
| 2006/0248386 A1 * | 11/2006 | Barga et al. | ................... | 714/15 |
| 2008/0148292 A1 * | 6/2008 | Goetz | ......................... | 719/320 |

* cited by examiner

*Primary Examiner*—Marc Duncan
(74) *Attorney, Agent, or Firm*—Mintz, Levin, Cohn, Ferris, Glovsky & Popeo, PC

(57) ABSTRACT

A wrapper can receive a request for application data. The wrapper wraps a first reference to a cross-session object and a second reference to a wrapper mapper object. Thereafter, the cross-session object can be accessed using the first reference and the wrapper mapper object is polled using the second reference to access a session-local object. The wrapper mapper object includes a wrapper list references the wrapper and any wrappers contained therein to facilitate recovery after session failover. Related apparatus, systems, methods, and articles are also described.

20 Claims, 23 Drawing Sheets

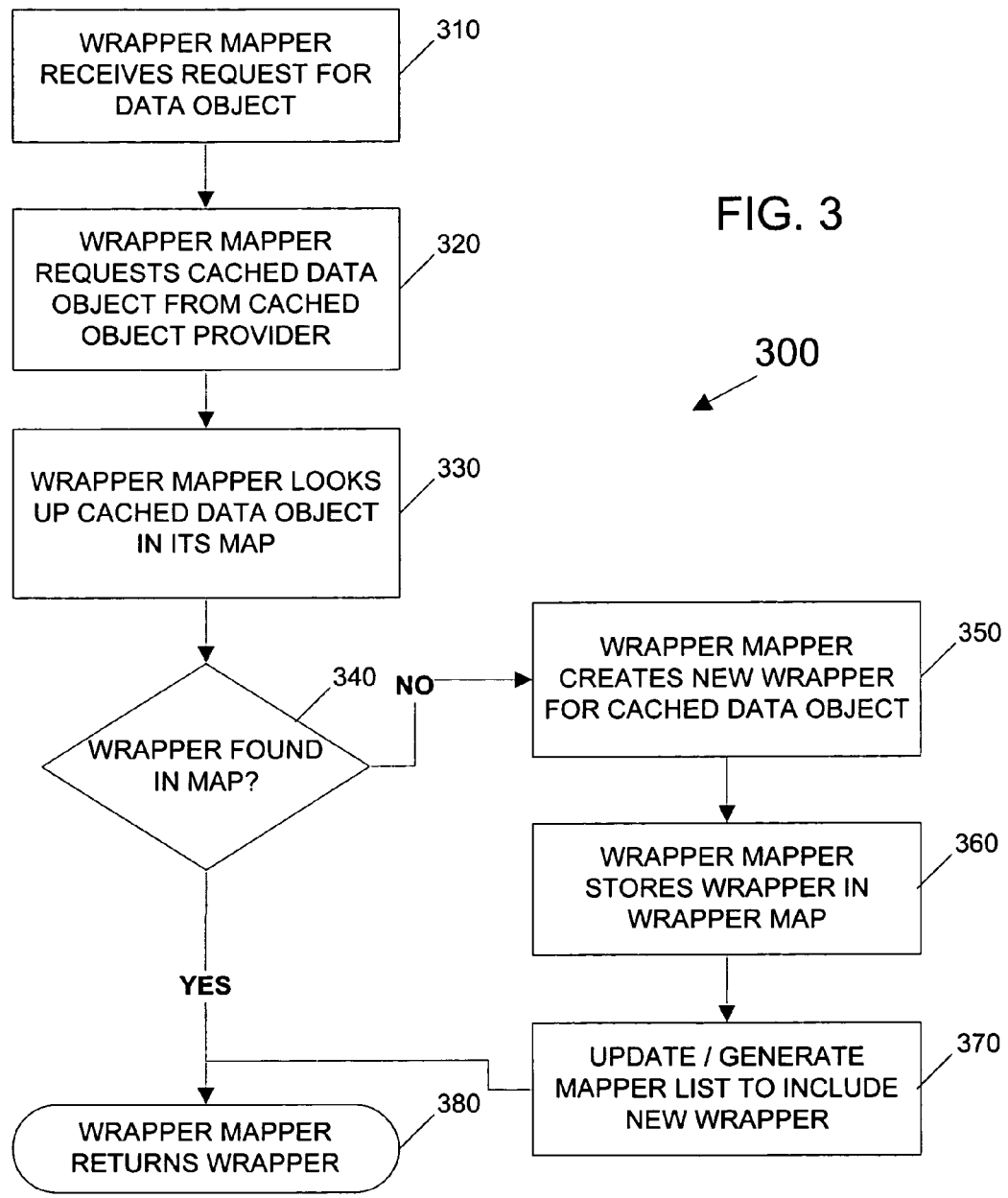

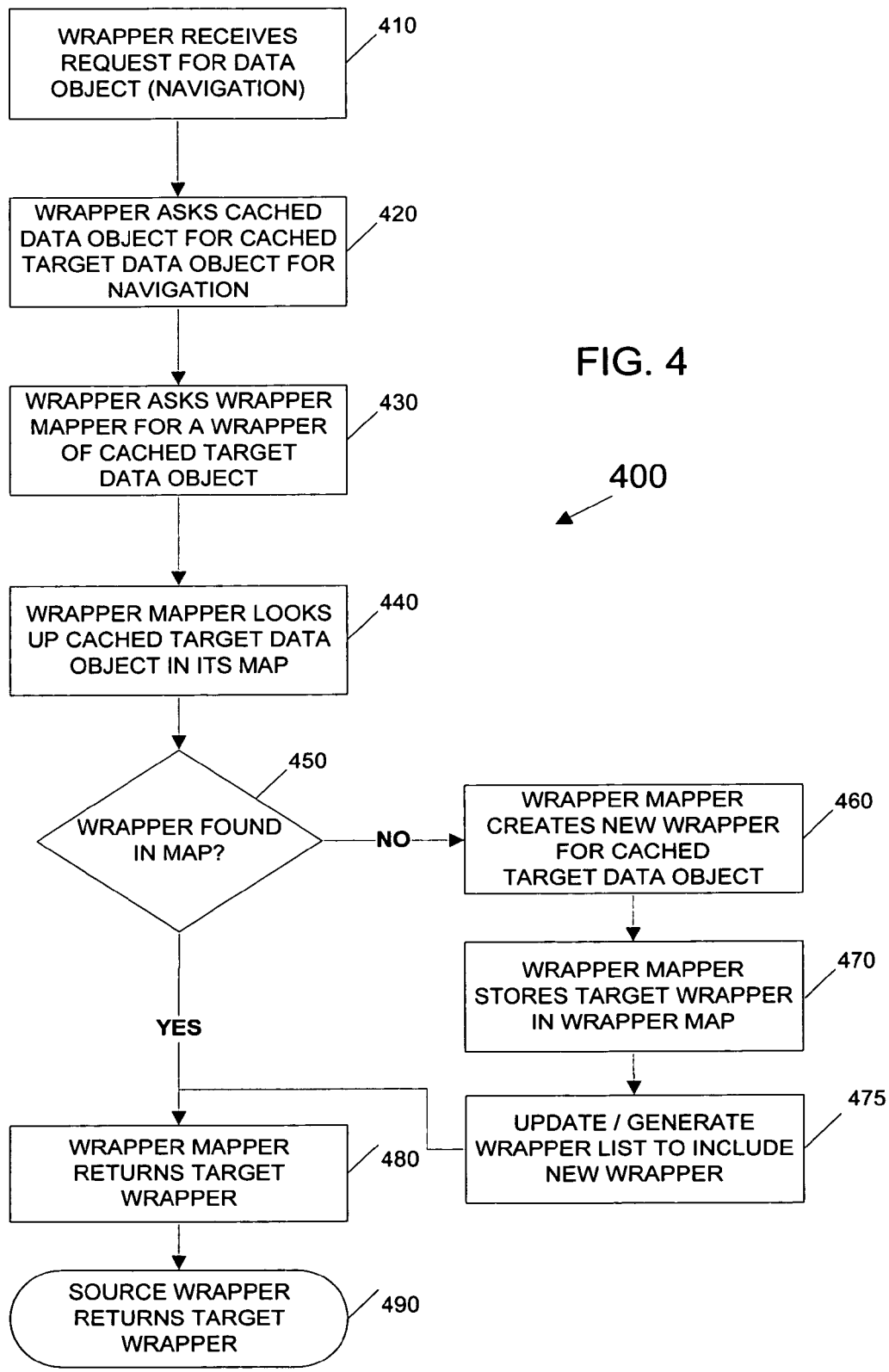

ON-DEMAND WRAPPERS OF APPLICATION DATA WITH SESSION FAILOVER RECOVERY

RELATED APPLICATION

This application is a Continuation-in-Part of U.S. patent application Ser. No. 11/585,533, filed Oct. 24, 2006, the contents of which are hereby fully incorporated by reference.

TECHNICAL FIELD

The subject matter described herein relates to thin on-demand wrappers of non-volatile application data with session failover recovery.

BACKGROUND

In server environments with numerous users running the same application, non-volatile application data, such as metadata, is often similar in most of such user sessions. However, such application data is not identical thereby necessitating data to be session-local. As a result, duplicative data is stored for the user sessions which results in unnecessarily high memory consumption.

With some conventional server environments, wrappers have been utilized which can act as an interfaces between a caller of the wrapper and code wrapped within the wrapper. In particular, a wrapper can be used as a small size data object that contains a reference to data that is used by many sessions (cross-session data) and a reference to data that is only used for a particular session associated with the wrapper (session-specific data). If data is organized in a graph in which every data object has a map of multiple references to other data objects, such maps must be copied into the wrappers (based on a requirement that the wrapper reference peer data objects of the same session). Such maps can become lengthy and also result in increased memory consumption. Moreover, if wrappers for a whole graph are created, many of the data objects do not get used and so the wrappers for such data objects also unnecessarily consume memory.

SUMMARY

In one aspect, a wrapper receives a request for application data. The wrapper stores a first reference to a cross-session object and a second reference to a wrapper mapper object. Thereafter, the cross-section object is accessed using the first reference. The mapper wrapper object is polled using the second reference to access a session-local object. The mapper wrapper object contains a wrapper list referencing the wrapper and any wrappers contained therein to facilitate recovery of the first reference and second reference after a session failover.

The polling can comprise returning, by the wrapper mapper object, a data object wrapper referencing the session-local object and then accessing the session-local object using the data object wrapper. In such cases, the wrapper list can refer to the wrapper and the data object wrapper. The wrapper mapper object can comprise a map associating session-local objects with references. The polling can additionally or alternatively include determining that a data object wrapper associated with the second reference does not exist, generating a data object wrapper storing the session-local object; returning, by the wrapper mapper object, the data object wrapper, and accessing the session-local object using the data object wrapper.

In some variations, the wrapper contains a child wrapper that stores a third reference to the wrapper and a fourth reference to a node of the cross-session object. This fourth reference can be provided in response to a request for data associated with the node of the cross-session object.

In an interrelated aspect, a first wrapper receives a request for application data. The first wrapper stores a reference to a wrapper mapper object and a second wrapper. The mapper wrapper object contains a wrapper list characterizing the first wrapper and the second wrapper. Thereafter, the wrapper mapper object is polled by the first wrapper to retrieve a reference to the cross-session object having a node associated with the application data. The first wrapper is then updated to include the reference to the session local object and the wrapper mapper object map is rebuilt (e.g., generated, etc.) using the wrapper list. The wrapper mapper object map associates the first wrapper with the session-local object and the second wrapper with the node of the cross-session object. Subsequently, the second wrapper is updated with a reference to the node of the cross-session object using the wrapper mapper object map to enable a return of the reference to the node of the cross-session object in response to requests for data associated with the node of the cross-session object.

In a further interrelated aspect, a wrapper mapper object receives a request for data contained in a business object. Thereafter, a reference to the business object is retrieved and a first wrapper containing a first reference to the business object and a second reference to the wrapper mapper object is generated. The first reference to the business object and a third reference to the first wrapper are stored in a map within the wrapper mapper object. In addition, the third reference to the first wrapper is stored in a wrapper list within the wrapper mapper object. A reference to the first wrapper is retrieved in response to the request, and the first wrapper receives a request for data associated with a node of the business object. The first wrapper requests data associated with the node of the business object from the wrapper mapper object. A second wrapper is generated within the first wrapper that contains a fourth reference to the node of the business object and a fifth reference to the first wrapper. The fourth reference to the node of the business object and a fifth reference to the second wrapper are stored in the map within the wrapper mapper object, and the fifth reference to the second wrapper is stored in the wrapper list to enable a return of the fourth reference in response to requests for the data associated with the node of the business object.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a process flow diagram illustrating a wrapper mapper acting as a data object provider;

FIG. 4 is a process flow diagram illustrating navigation from a first data object wrapper to a second data object wrapper;

Like reference symbols in the various drawings indicate like elements.

DETAILED DESCRIPTION

Figure 1:
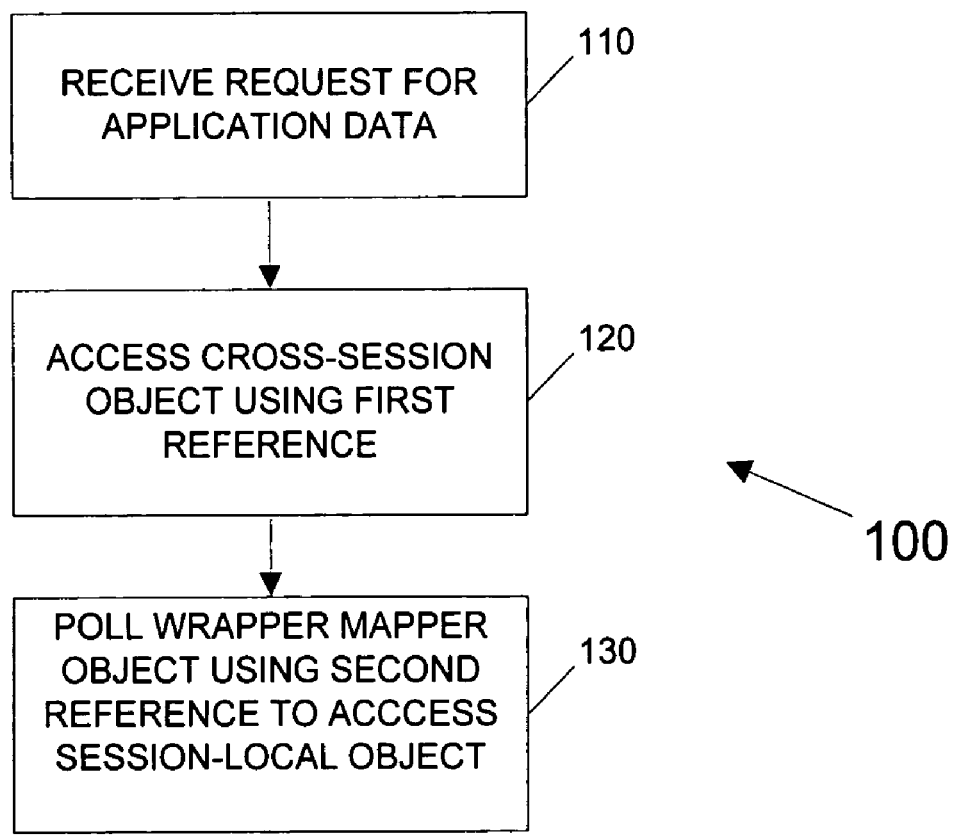
FIG. 1 is a process flow diagram illustrating a method of generating on-demand wrappers of application data with session failover recovery.

FIG. 1 is a process diagram illustrating a method 100 in which, at 110, a request is received by a wrapper for application data. The wrapper stores a first reference to a cross-session object and a second reference to a wrapper mapper object. Thereafter, at 120, the cross-session object is accessed using the first reference. In addition, at 130, the wrapper mapper object is polled using the second reference to access a session local object in order to provide the requested application data. The wrapper mapper object contains a wrapper list referencing the wrapper and any wrappers contained therein to facilitate recovery of the first reference and second reference after a session failover.

Figure 2A:
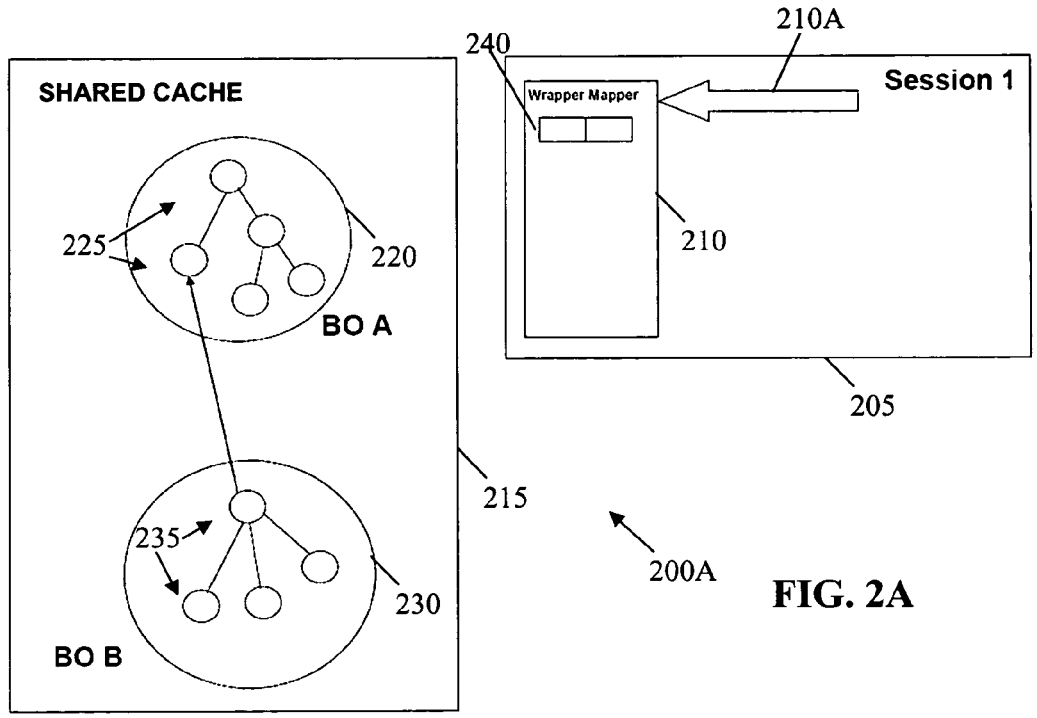
FIGS. 2A-2AD are diagrams illustrating creation of on-demand wrappers of application data.
Figure 2B:
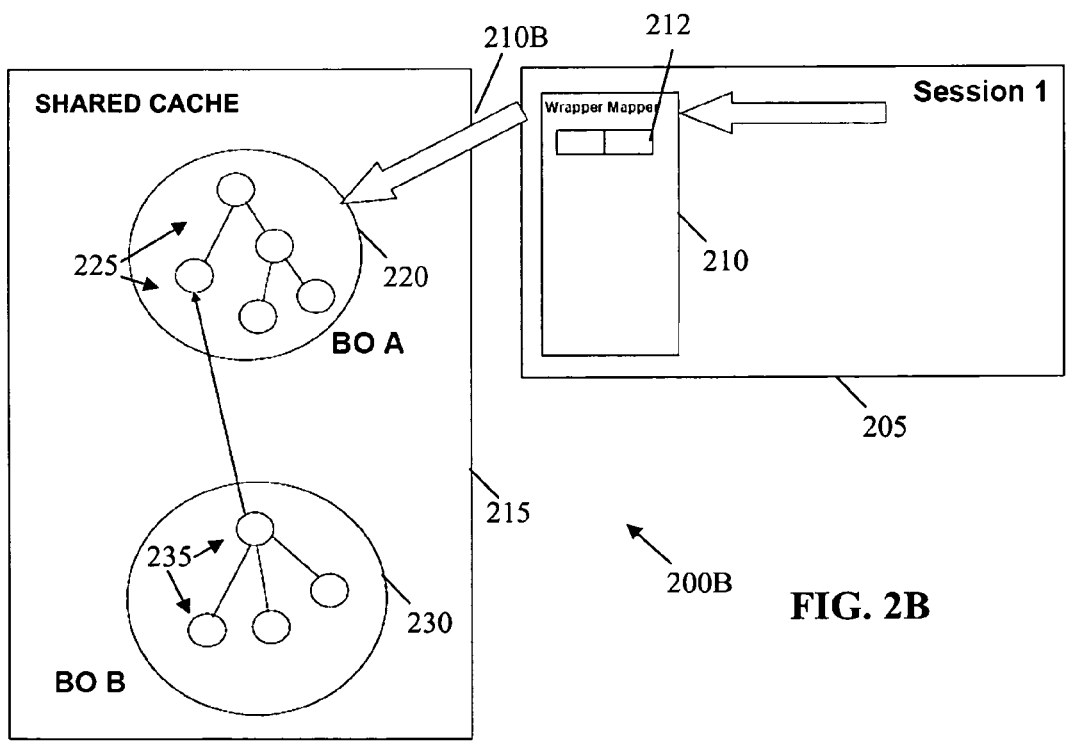
Figure 2C:
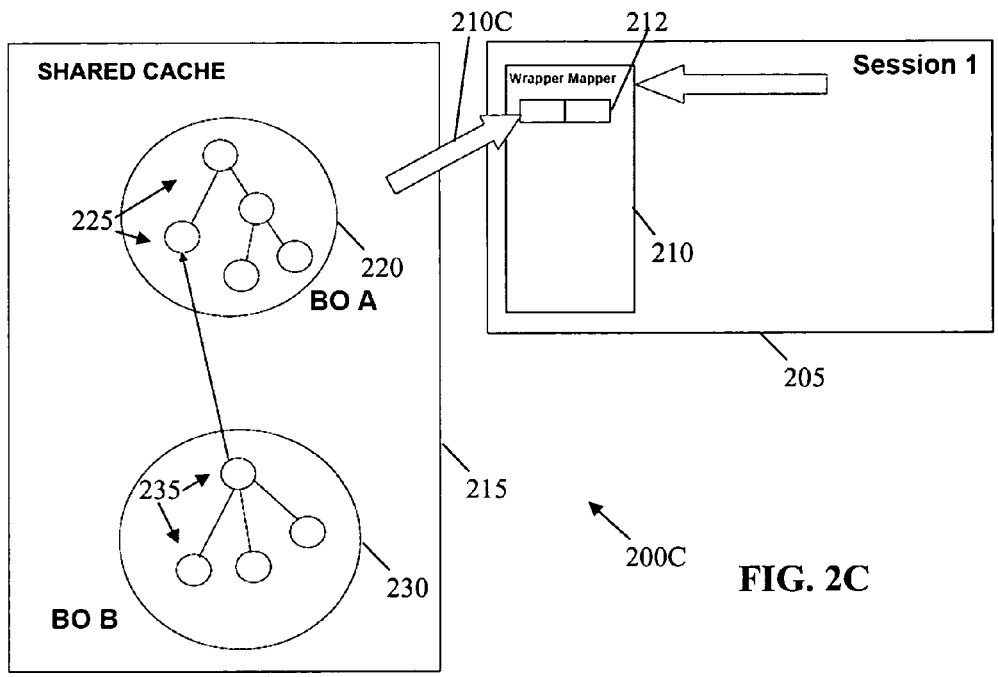
Figure 2D:
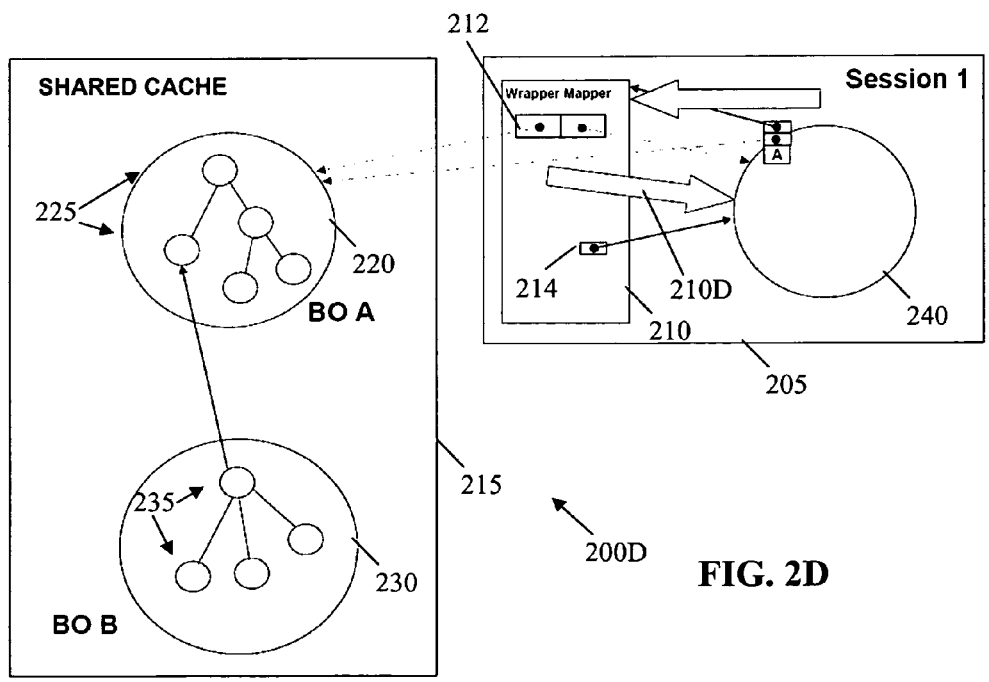
Figure 2E:
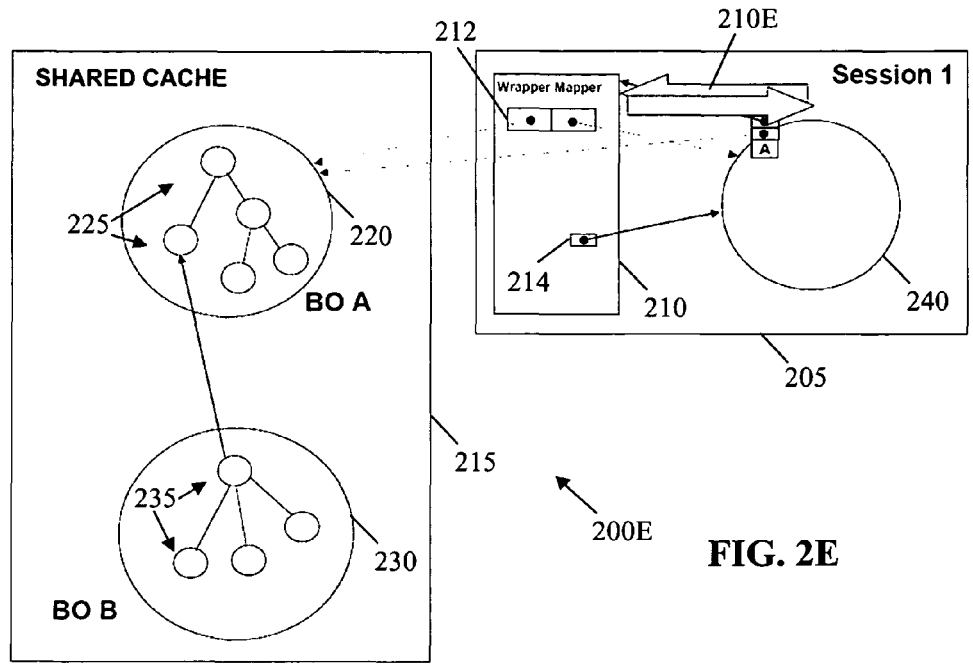
Figure 2F:
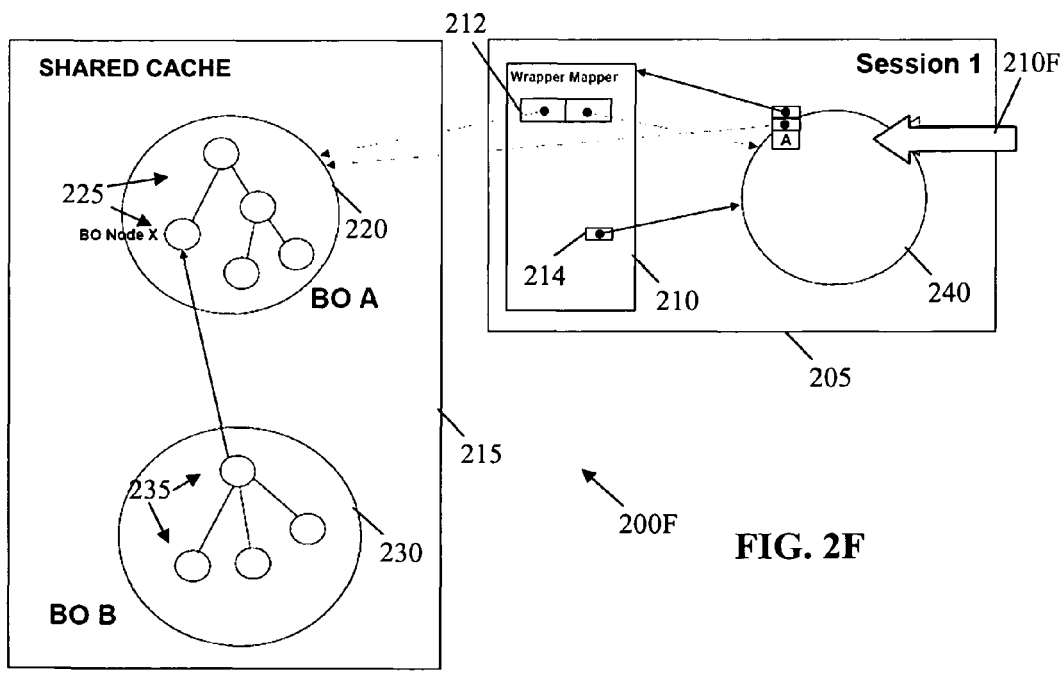
Figure 2G:
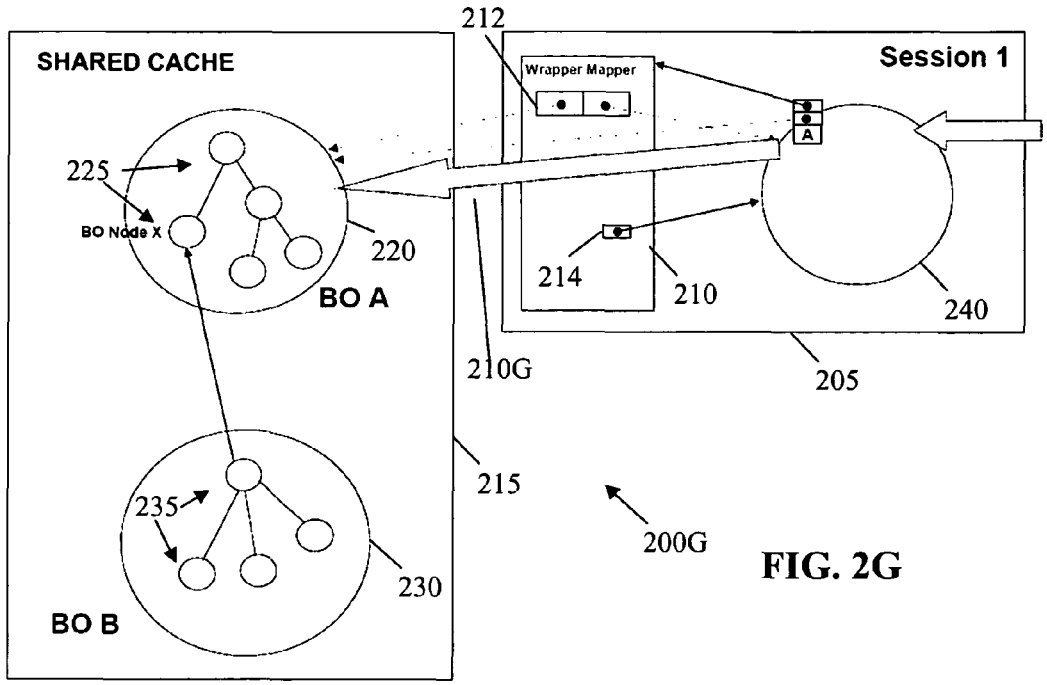
Figure 2H:
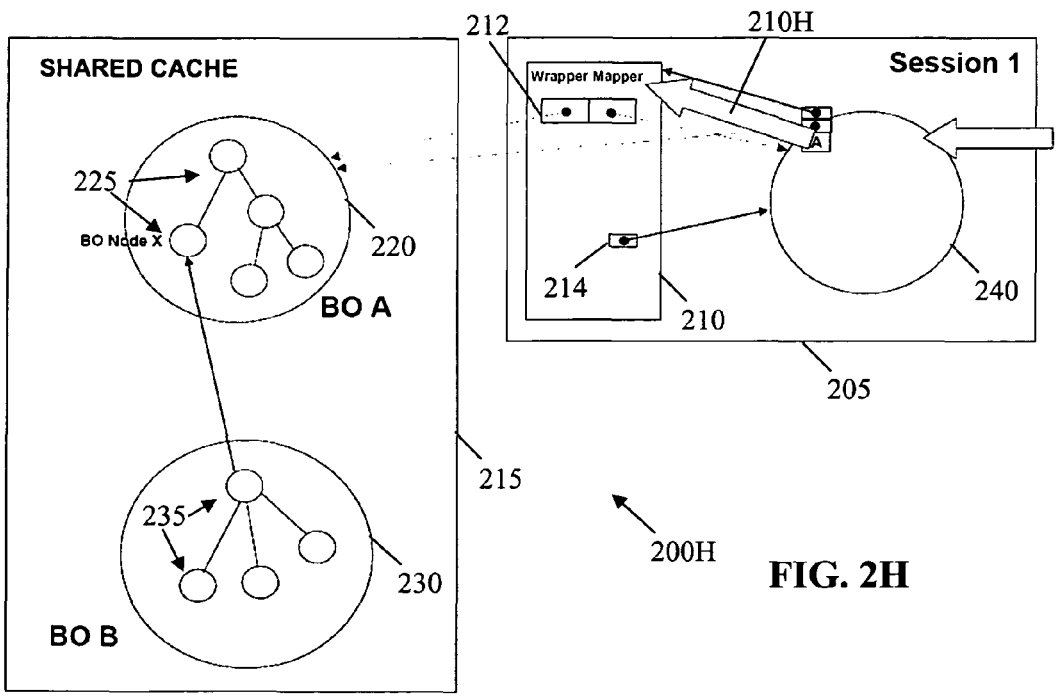
Figure 2I:
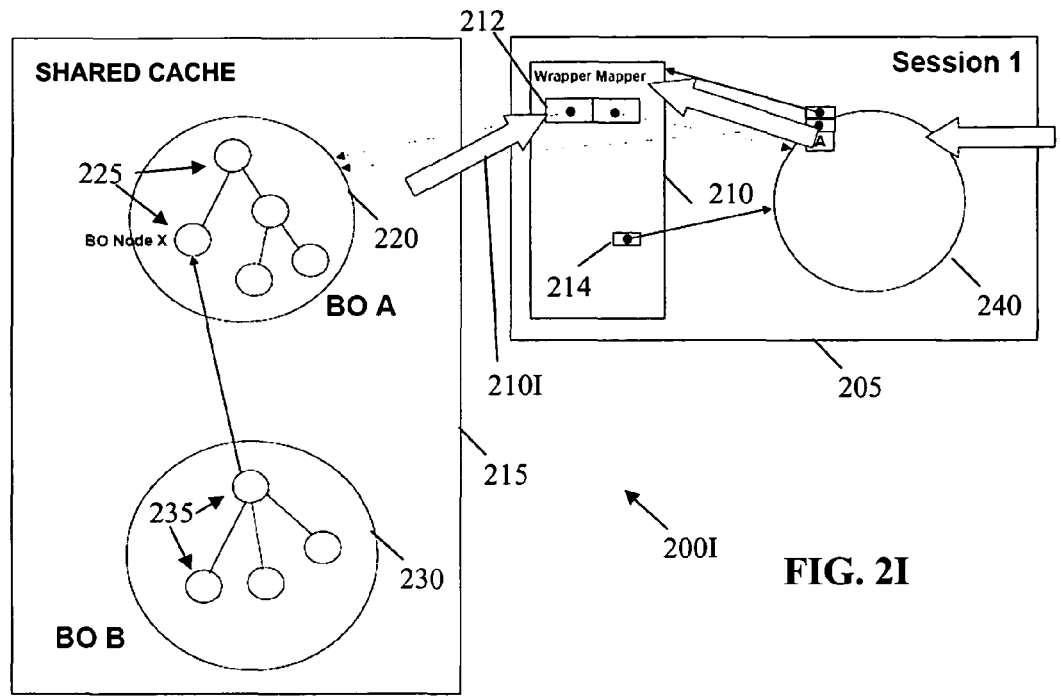
Figure 2J:
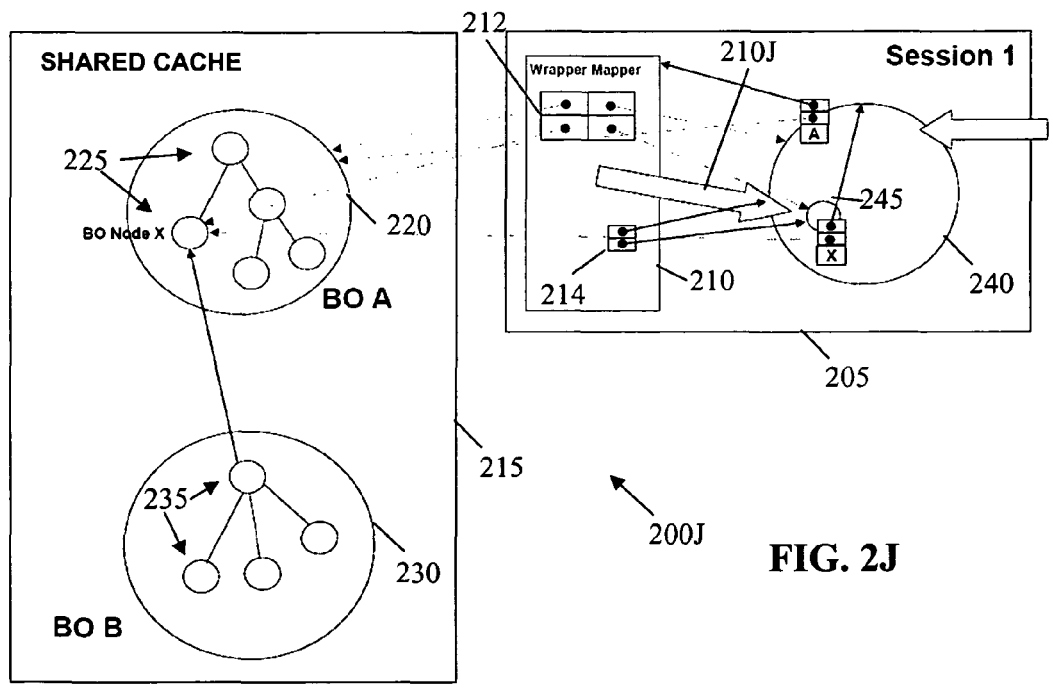
Figure 2K:
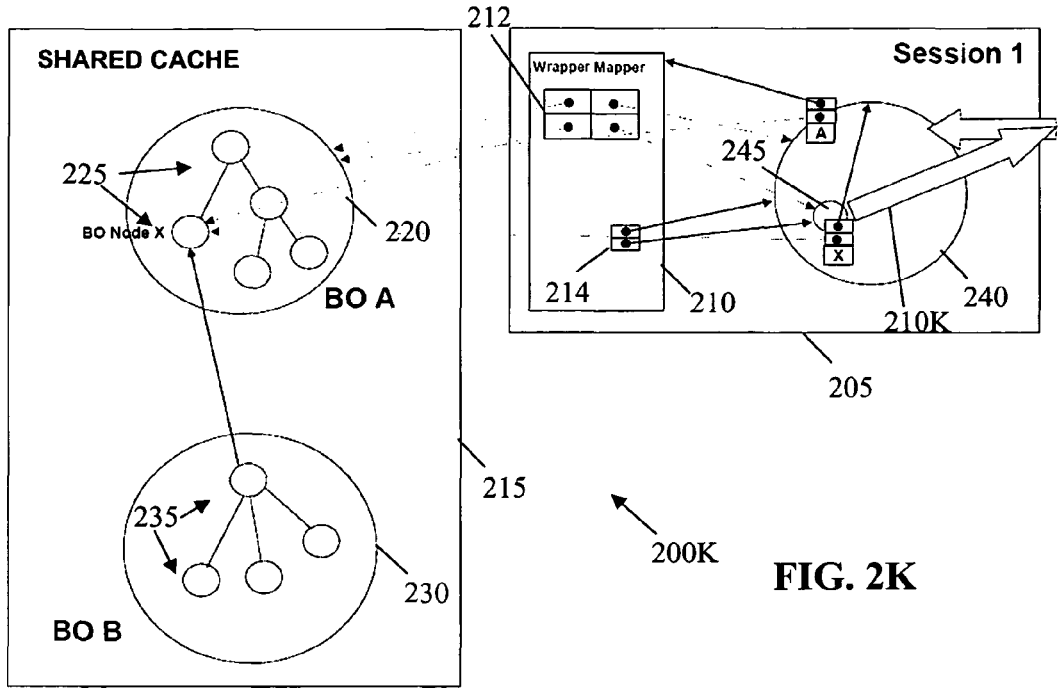
Figure 2L:
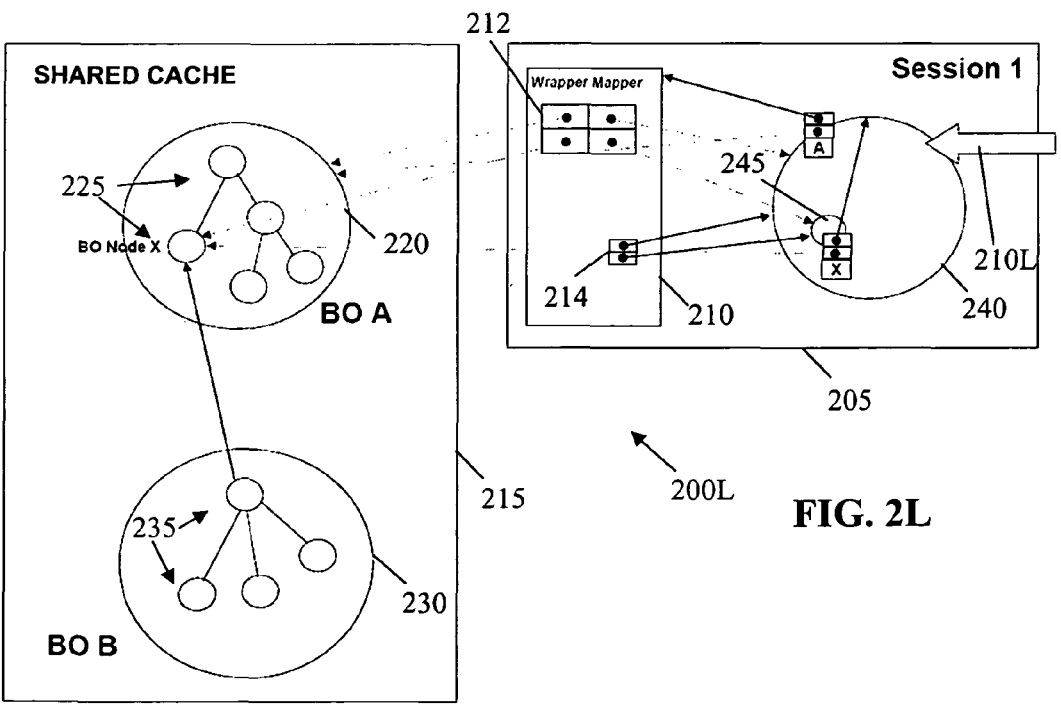
Figure 2M:
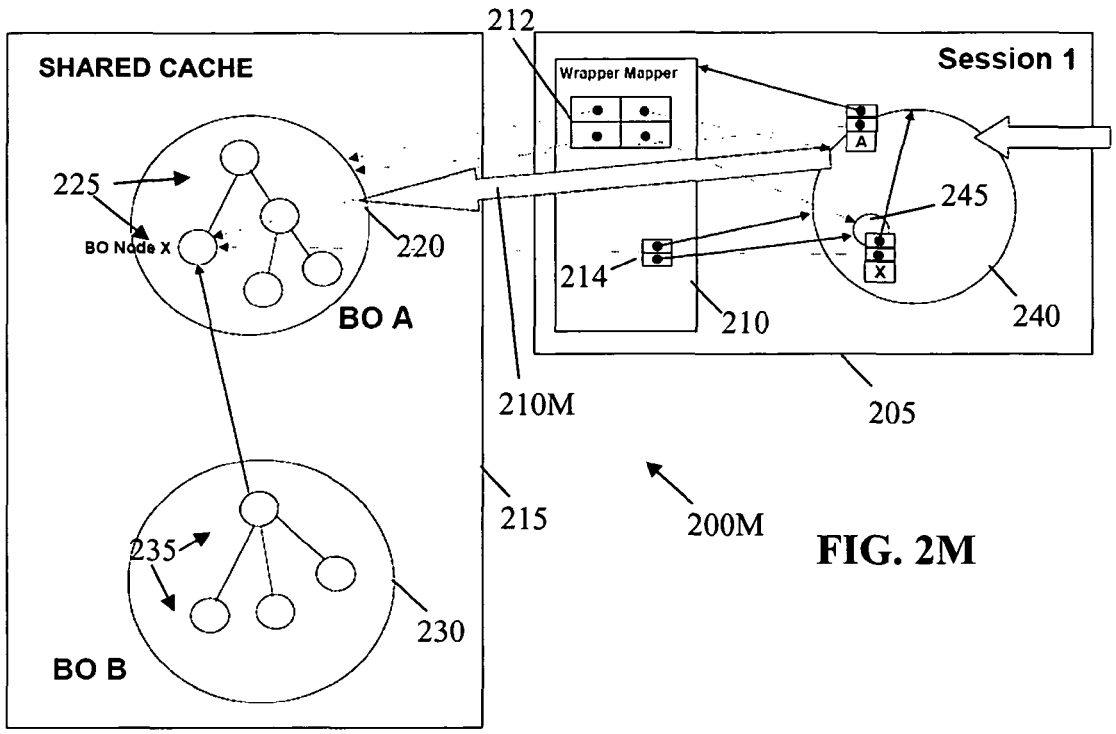
Figure 2N:
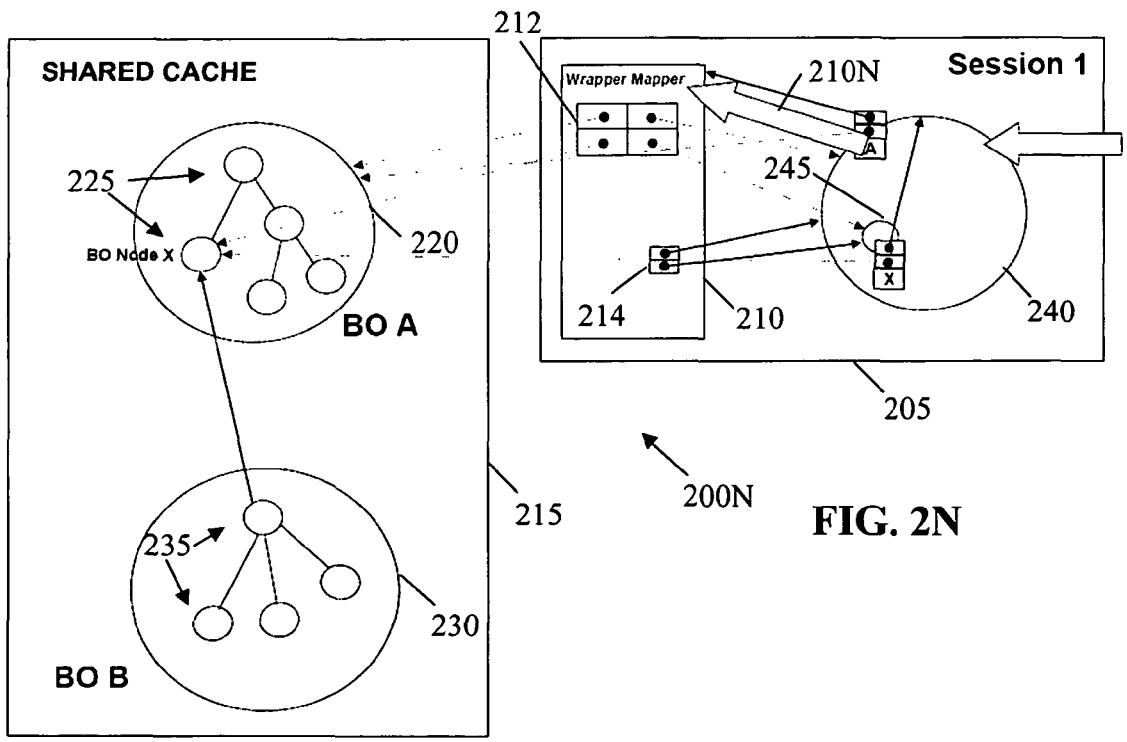
Figure 2O:
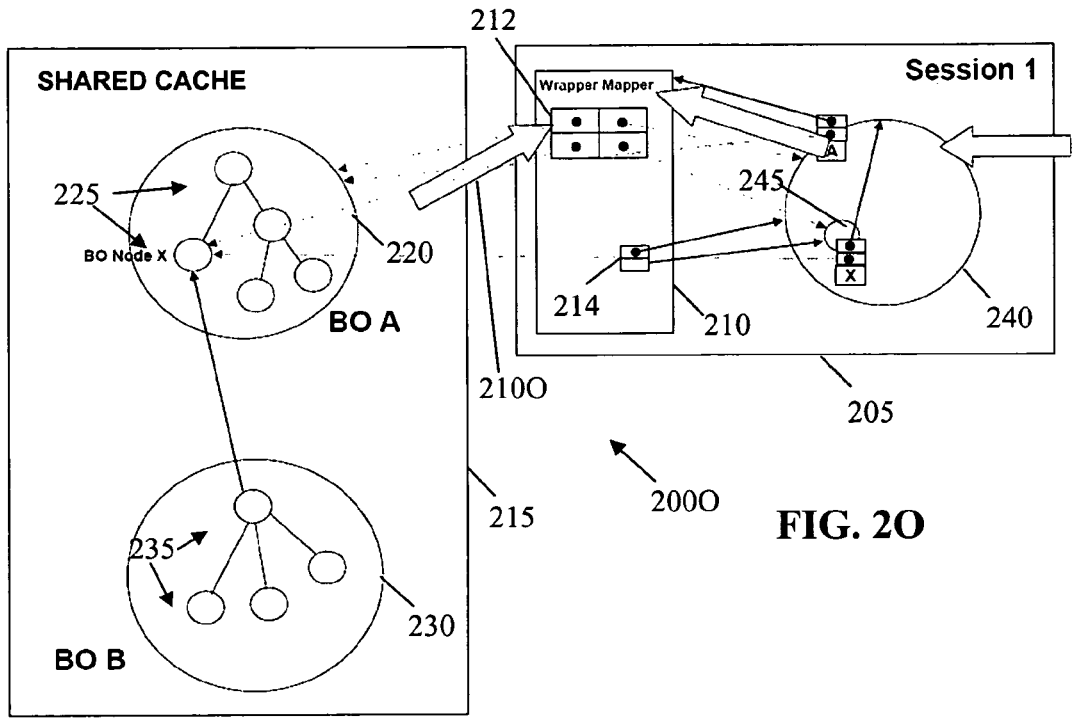
Figure 2P:
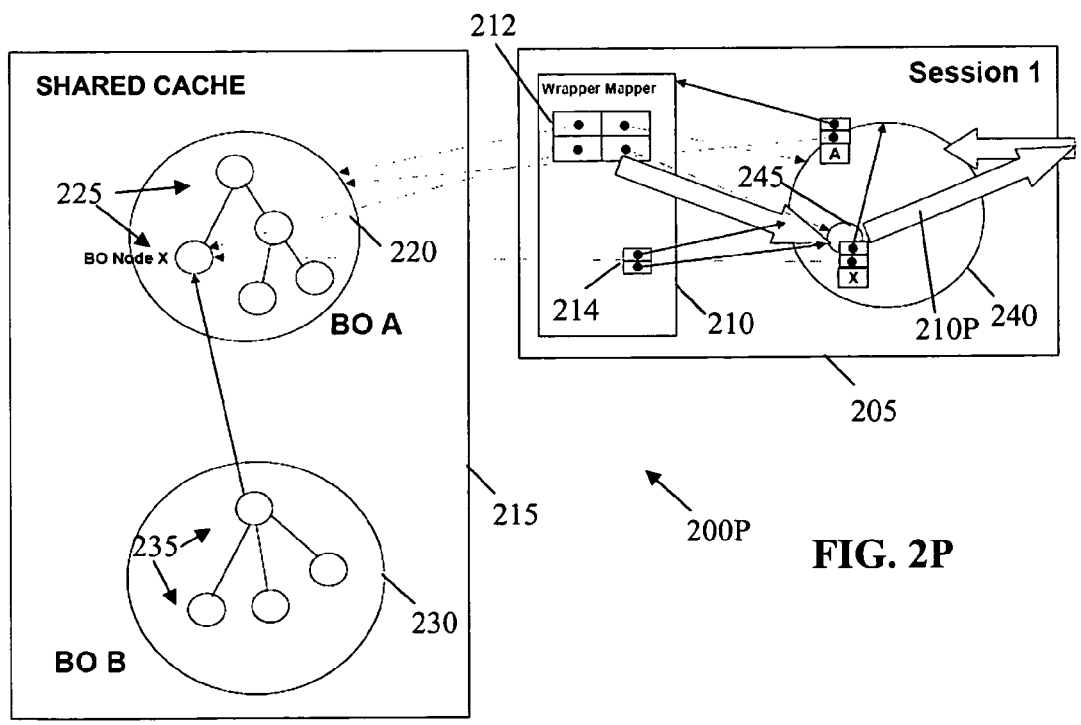

FIGS. 2A-2AD are diagrams 200A-200AD illustrating a first session 205 of an application in a server environment (with a plurality of concurrent sessions) that includes a wrapper mapper object 210. Reference numbers with letters appended thereto refer to the corresponding figures. The wrapper mapper object 210 can include a map 212 with all cross-session data objects for which a wrapper has been created as a key and the created wrappers as a value. A shared cache includes business objects A 220 and business object B which are linked together and which respectively include hierarchically arranged nodes 225, 235.

At 210A, business object A 220 is requested from the wrapper mapper object 210. Thereafter, at 210B, a reference to cached business object A 220 is retrieved. The contents of wrapper mapper object 210, at 210C is then checked to see if there is a wrapper for business object A 220. If there is no wrapper, then, at 210D, a BO wrapper 240 is created and reference to the wrapper is stored in the map 212 within the wrapper mapper object 210. In addition, a wrapper list 214 is generated The wrapper mapper object 210 then returns, at 210E, a reference to the newly created BO wrapper 240.

The BO wrapper 240 can receive a request, at 210F, for data from one of the nodes 225 of business object A 220. A wrapped reference (e.g., descriptor, etc.) in the BO wrapper 240 is then accessed, at 210G, to obtain a reference to cached node 225 of business object A 220 (which is a cross-session object). The wrapper mapper object 210 is then polled, at 210H, to obtain a BO node wrapper for the cached node 225 of business object A. A map within the wrapper mapper object 210 is checked, at 210I, to see if a wrapper has already been created. If a wrapper has not been created, then at 210J, a BO node wrapper 245 is created and it is stored in the wrapper mapper object 210 map. The BO node wrapper 240 includes a reference to the node 225 of the business object A and additionally a reference to the "parent" wrapper 240. In addition, the wrapper list 214 is updated to include a reference to the BO node wrapper. Thereafter, at 210K, a reference to the BO node wrapper 245 is returned.

In response to receipt, at 210L, of a subsequent request for the cached node 225 of business object A 220, a wrapped reference (e.g., descriptor, etc.) is asked, at 210M, for the cached node 225 of business object A 220. In addition, at 210N, the wrapper mapper object 210 is asked for the BO node wrapper 245 for the cached node 225 of business object A. The map 212 within wrapper mapper object 210 is then checked, at 210O, to see if there is a related wrapper. As the BO node wrapper 245 has already been referenced in the map 212 of wrapper mapper object 210, at 210P, the reference is returned.

Figure 2Q:
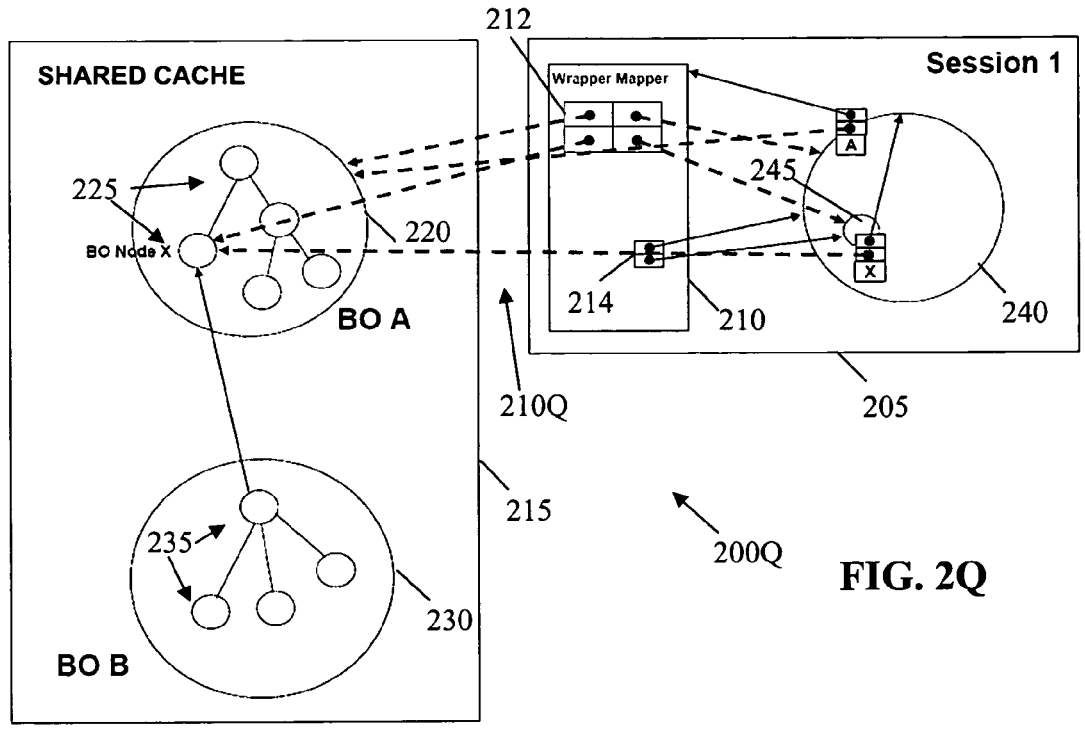
Figure 2R:
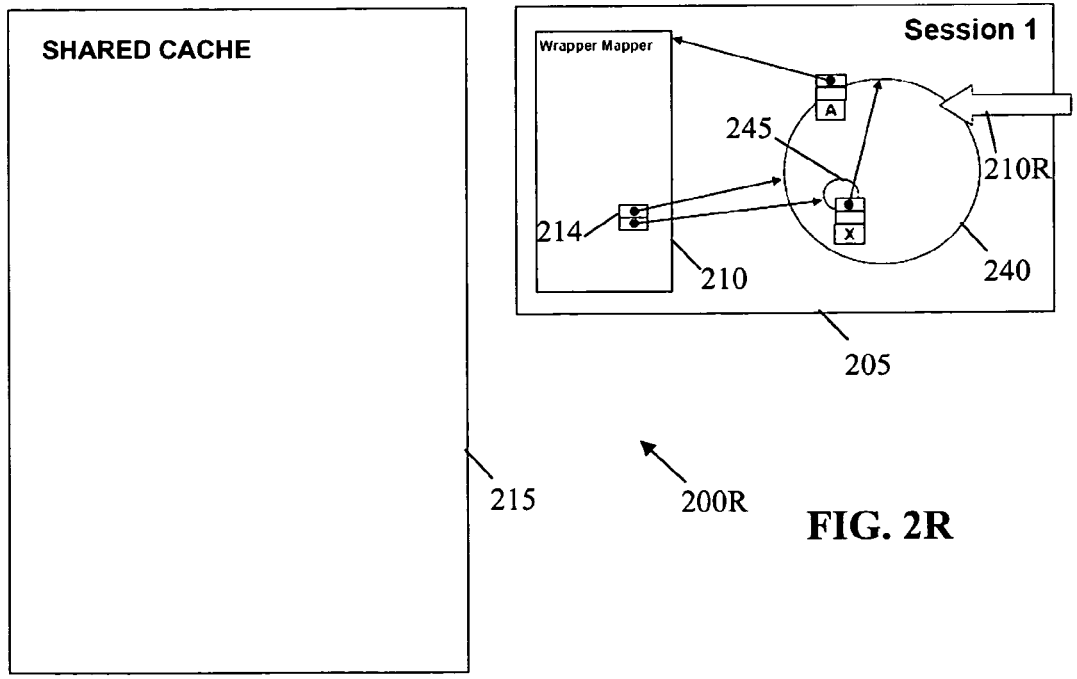
Figure 2S:
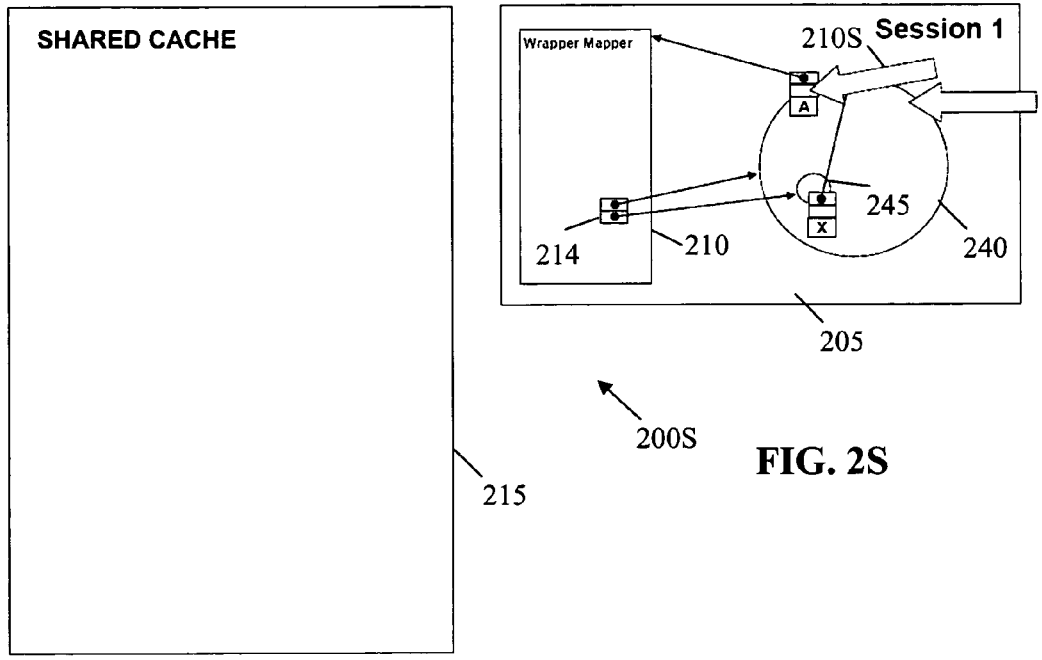
Figure 2T:
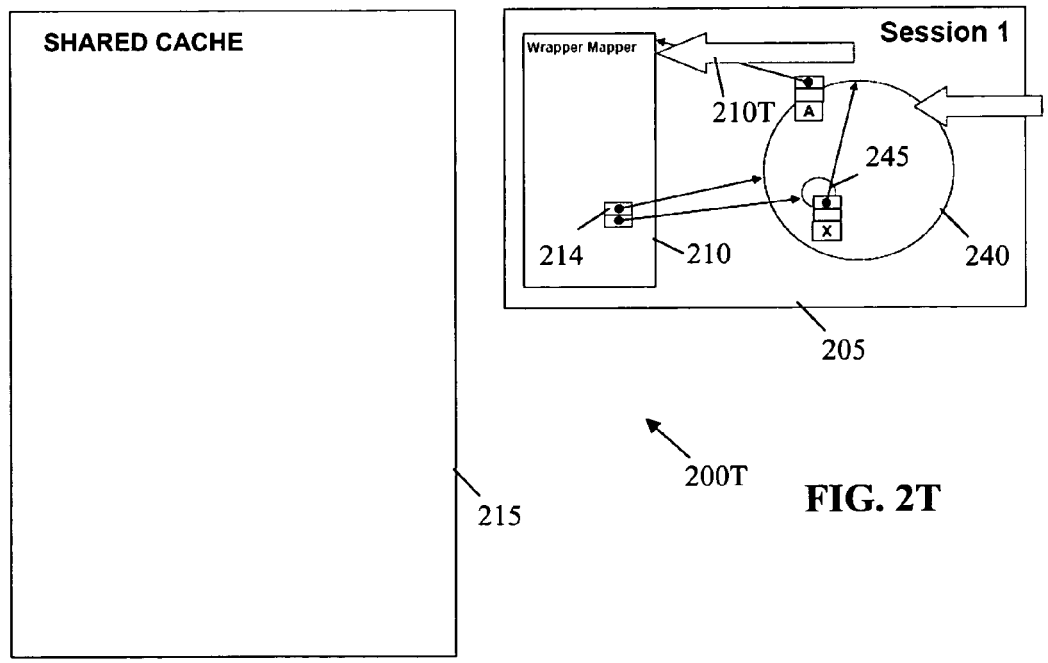
Figure 2U:
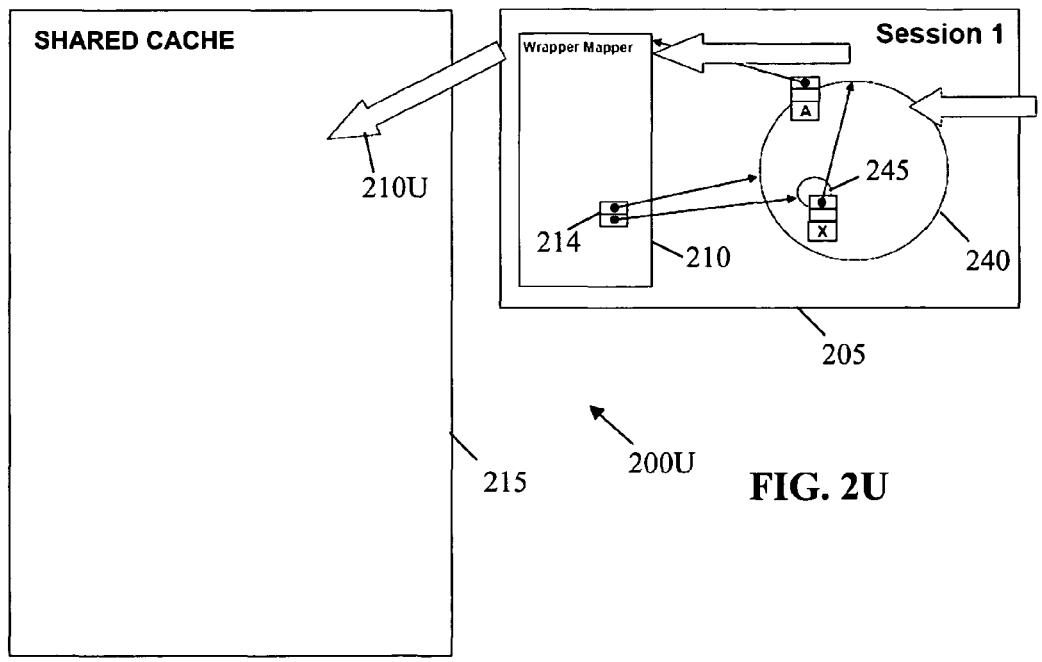
Figure 2V:
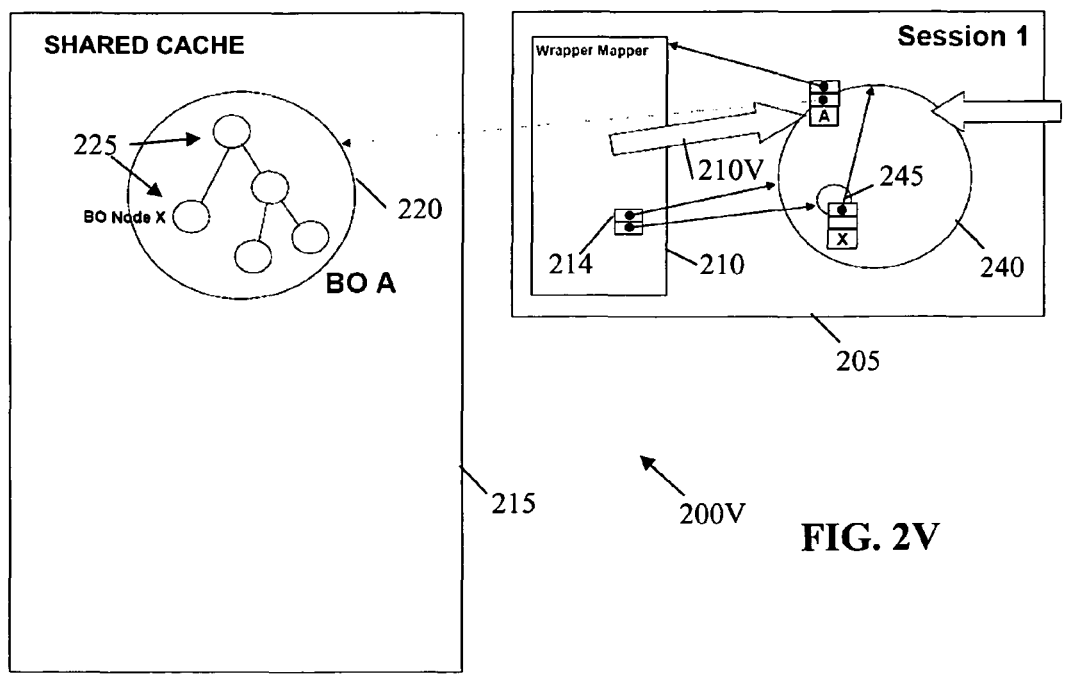
Figure 2W:
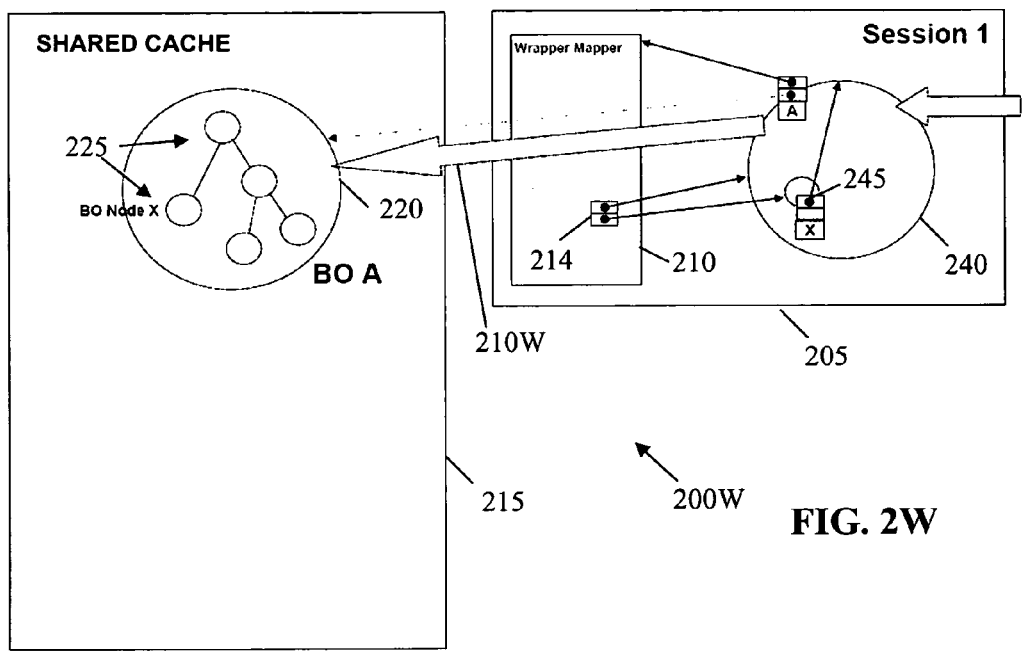
Figure 2X:
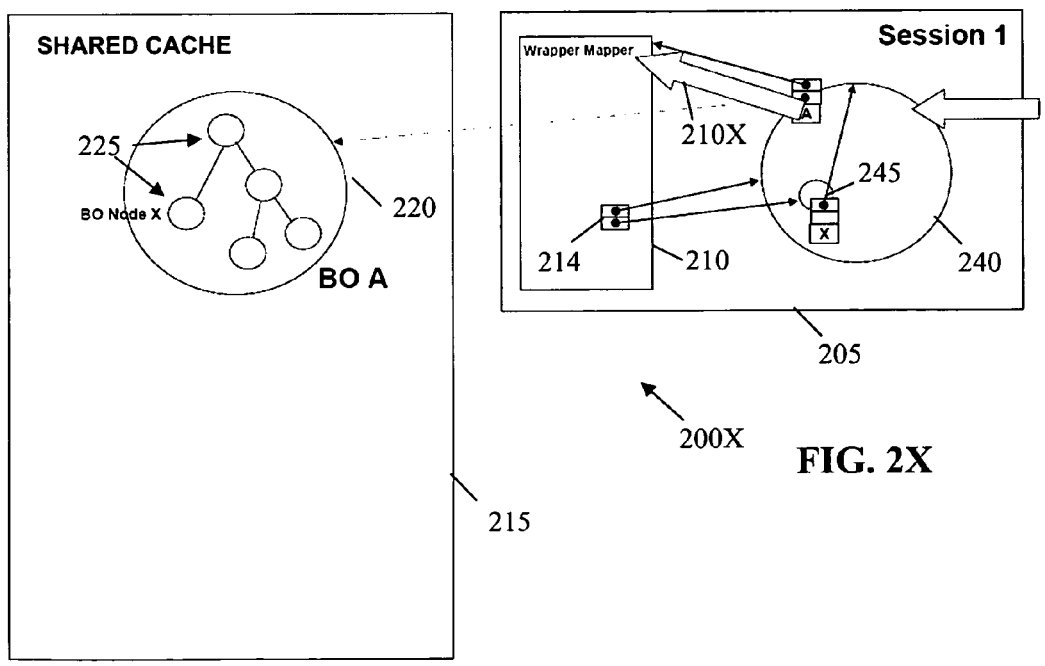
Figure 2Y:
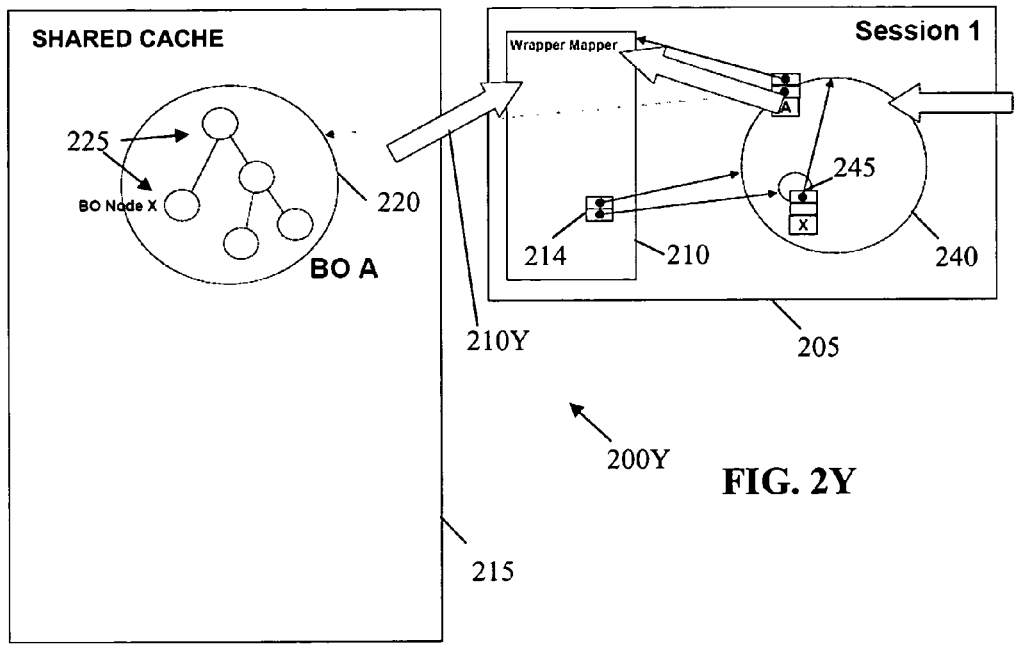
Figure 2Z:
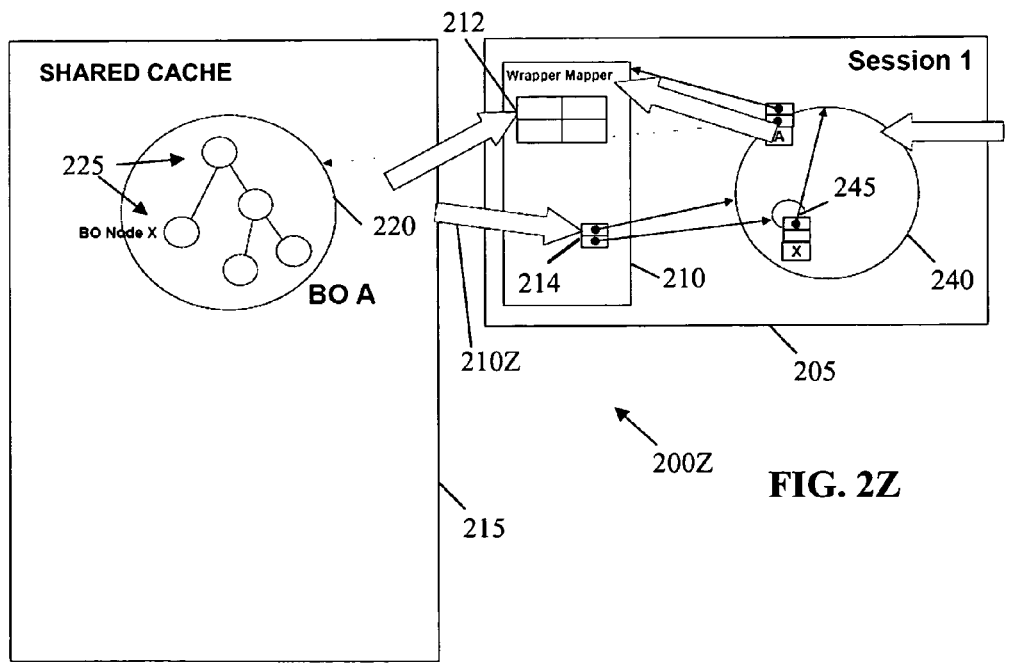
Figure 2A:
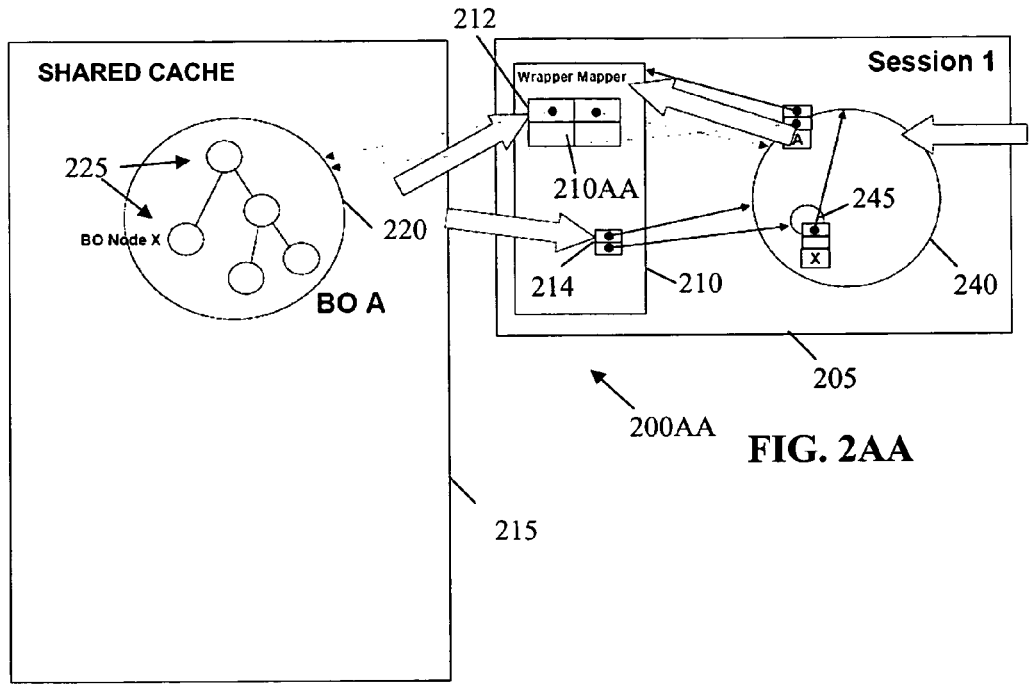
Figure 2A:
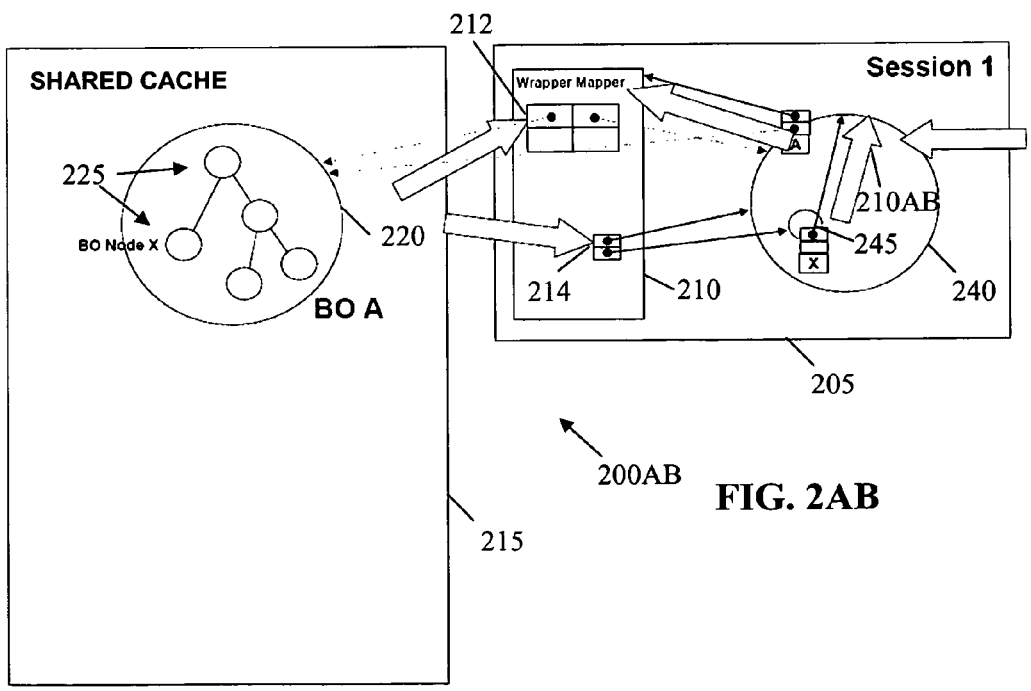
Figure 2A:
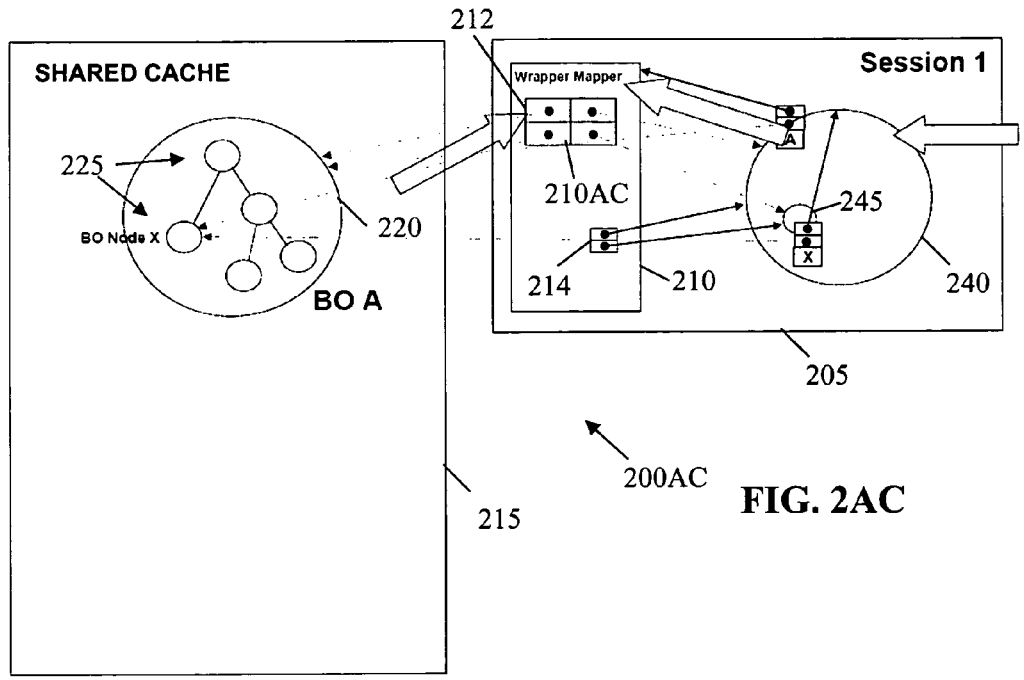
Figure 2A:
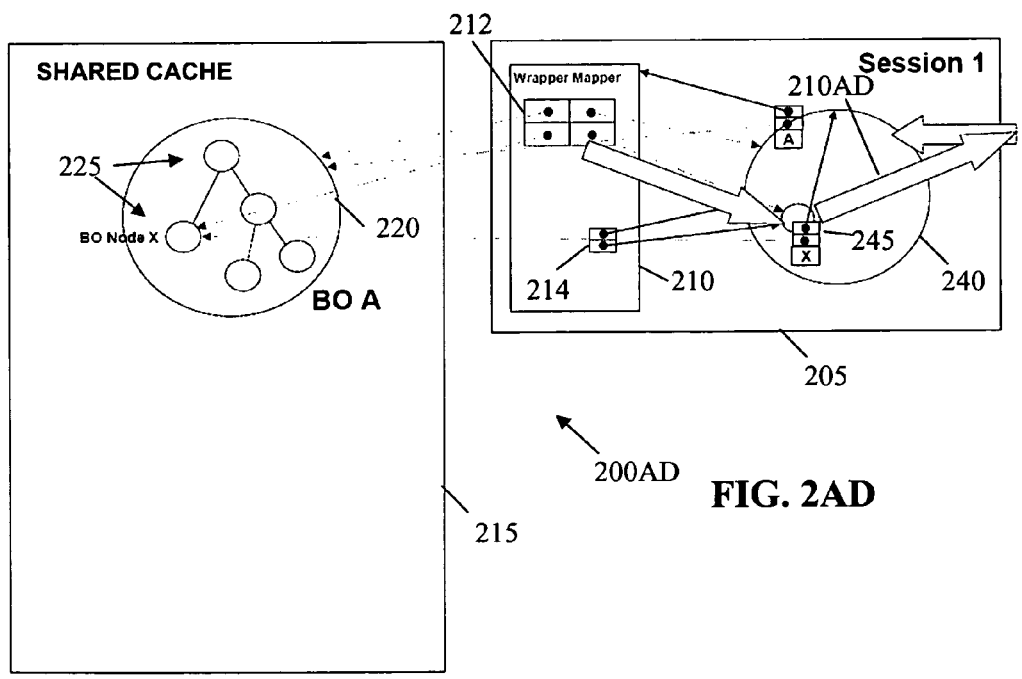

FIGS. 2Q-2AD illustrate diagrams 200Q-200AD in which, as illustrated in FIG. 2Q, a session failover has occurred resulting in the loss of any transient references and variables 210Q (i.e., the references in the map 212 as well as the references in the wrappers 240, 245 to business object A 220, etc.) and such references are rebuilt. At 210R, the wrapper 240 receives a request for a node 225 of business object A. The wrapper checks, at 210S, whether there is a reference to the requested node. In this case, there is no such reference (i.e., it is null), and so, at 210T, cached business object A is requested at the wrapper mapper 210. Subsequently, at 210U, the wrapper mapper object 210 retrieves a reference to the cached business object A 220 (which could trigger a reload from a backend system into the cache). After the business object A 220 is cached, at 210V, a transient reference to business object A 220 is stored in wrapper 240. Next, at 210W, business object A 220 is polled to obtain a reference to a node 225 of business object A 220. At 210X, the wrapper mapper object 220 is asked for a business object node wrapper 245 for the cached node 225.

At 210Y, the wrapper mapper object 210 is checked to determine if it has a map. In this case, there is no map due to the session failover, and so the process of rebuilding map 212 commences. At 210Z, the mapper wrapper generates a new map 212 is generated and all wrappers in the wrapper list are looped over. Thereafter, for each wrapper in the wrapper list, the cached object that is wrapped by such wrapper is identified (by asking the wrapper itself), and the resulting pair is stored in the map 212 before the wrapper mapper proceeds to the next wrapper in the list (see, for example, FIG. 8). If the wrapper determines that its internal reference to the cached object is not present when asked by the wrapper mapper, it has to access the parent in the wrapper hierarchy and ask for that parent wrapper's cached object (which has a method by which the desired cached object can be retrieved (by using the name stored in the wrapper). Once the map 212 has been updated to include the wrapper references, at 210AA, the wrapper 240 returns a reference to cached business object A which is then added to the map 212. The wrapper 240 can then be asked, at 210 AB, for cached node 225 of business object A 220 to enable, at 210AC, the rebuilding of the map 212 with regard to such node. Lastly, at 210AD, the "child" wrapper, which is now part of map 212, is returned.

FIG. 3 is a process flow diagram illustrating a method 300 in which a wrapper mapper is asked for a data object in its role as data object provider. At 310, the wrapper mapper receives a request for a data object. Thereafter, at 320, the wrapper mapper requests a cached data object from a cached object provider. In addition, at 330, the wrapper mapper looks up the cached data object in its map. If the wrapper is found in the map at 340, then the wrapper mapper returns, at 370, the wrapper to the cached data object. Otherwise, the wrapper mapper, at 350, creates a new wrapper for the cached data object and the wrapper mapper, at 370, stores the wrapper in the wrapper map so that the wrapper can be subsequently returned at 380. In addition, at 360, a wrapper list can be updated or generated to include the new wrapper.

FIG. 4 is a process flow diagram illustrating a method 400 in which a wrapper is asked for a data object in its role as data object provider. A wrapper, at 410, receives a request for a data object in connection with an initial navigation. As a result, the wrapper, at 420, asks a cached data object for a cached target data object for the navigation. In addition, the wrapper, at 430, asks a wrapper mapper for a wrapper of the cached target data object. The wrapper mapper then, at 440, looks up the cached target data object in its map. If the wrapper is found in the map at 450, the wrapper mapper, at 460, returns the target wrapper and at 480, the source wrapper, at 490 returns the target wrapper. If a wrappers is not found in the map at 450, then the wrapper mapper, at 460, creates a new wrapper for the cached target data object and the, at 470, stores the target wrapper in the wrapper map so that, at 480, the target wrapper can be returned by the wrapper mapper, and the source wrapper can subsequently, at 480 return the target wrapper. In addition, at 475, the new wrapper is added to a wrapper list or the wrapper list is generated to include a reference to the new wrapper.

Figure 5:
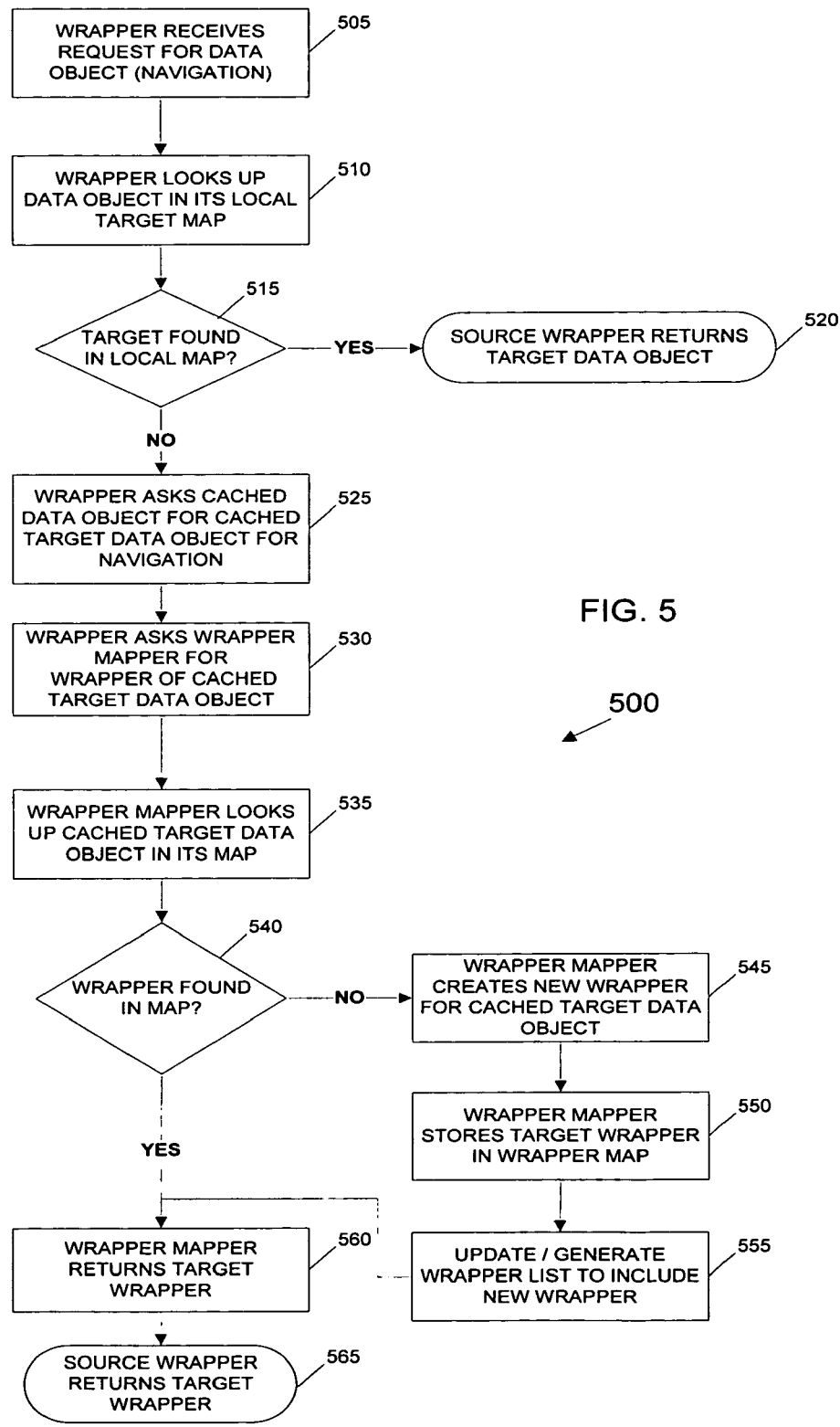
FIG. 5 is a process flow diagram illustrating navigation from a first object wrapper holding a map of local navigation targets to a second data object wrapper.

FIG. 5 is a process flow diagram illustrating a method 500 in which a wrapper is asked for a data object in its role as data object provider and the wrapper holds map of local navigation targets that are only visible in the local session. A wrapper, at 505, receives a request for a data object in connection with an initial navigation. Thereafter, at 510, the wrapper looks up the data object in its local target map. If the target is found in the local map, at 515, then a source wrapper returns the target data object at 520. Otherwise, at 525, the wrapper asks a cached data object for a cached target data object for the navigation. In addition, the wrapper, at 530, asks a wrapper mapper for a wrapper of the cached target data object. The wrapper mapper then, at 535, looks up the cached target data object in its map. If the wrapper is found in the map at 540, the wrapper mapper, at 555, returns the target wrapper and at 560, the source wrapper, at 550 returns the target wrapper. If a wrappers is not found in the map at 540, then the wrapper mapper, at 545, creates a new wrapper for the cached target data object and then, at 550, stores the target wrapper in the wrapper map so that, at 560, the target wrapper can be returned by the wrapper mapper, and the source wrapper can subsequently, at 565, be returned the target wrapper. Additionally, at 555, a wrapper list is updated or generated to include the new wrapper.

Figure 6:
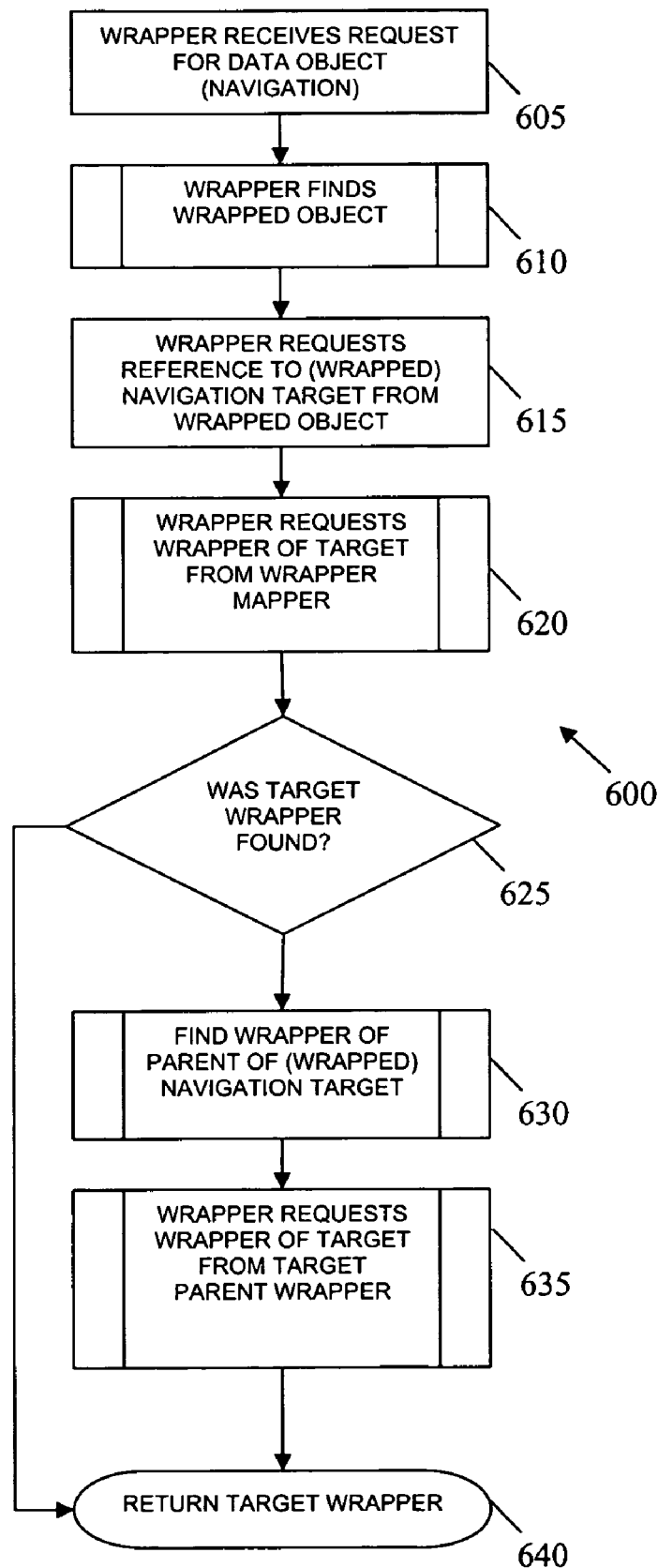
FIG. 6 is a process flow diagram illustrating a technique for calling a navigation method on a wrapper.

FIG. 6 is a process flow diagram illustrating a method 600 for calling a navigation method on a wrapper in which, at 605, a wrapper receives a request for a data object (navigation). Thereafter, at 610, the wrapper finds the wrapped object (see also FIG. 7 below) and then, at 615, the wrapper requests a reference to a wrapped navigation target from the wrapped object. The wrapper then, at 620, requests the wrapper of the target object from a wrapper mapper (see also FIG. 8 below). It is then determined, at 625, whether the target wrapper was found. If so, at 640, the target wrapper is returned. If not, at 630, the wrapper of the parent (wrapped) navigation target is found (this can be implemented specifically according to semantic details of the stored objects by overriding this method in the specific implementation class) so that, at 635, the wrapper requests the wrapper of the target from the target parent wrapper (see also FIG. 9 also) so that, at 640, the target wrapper can be returned.

Figure 7:
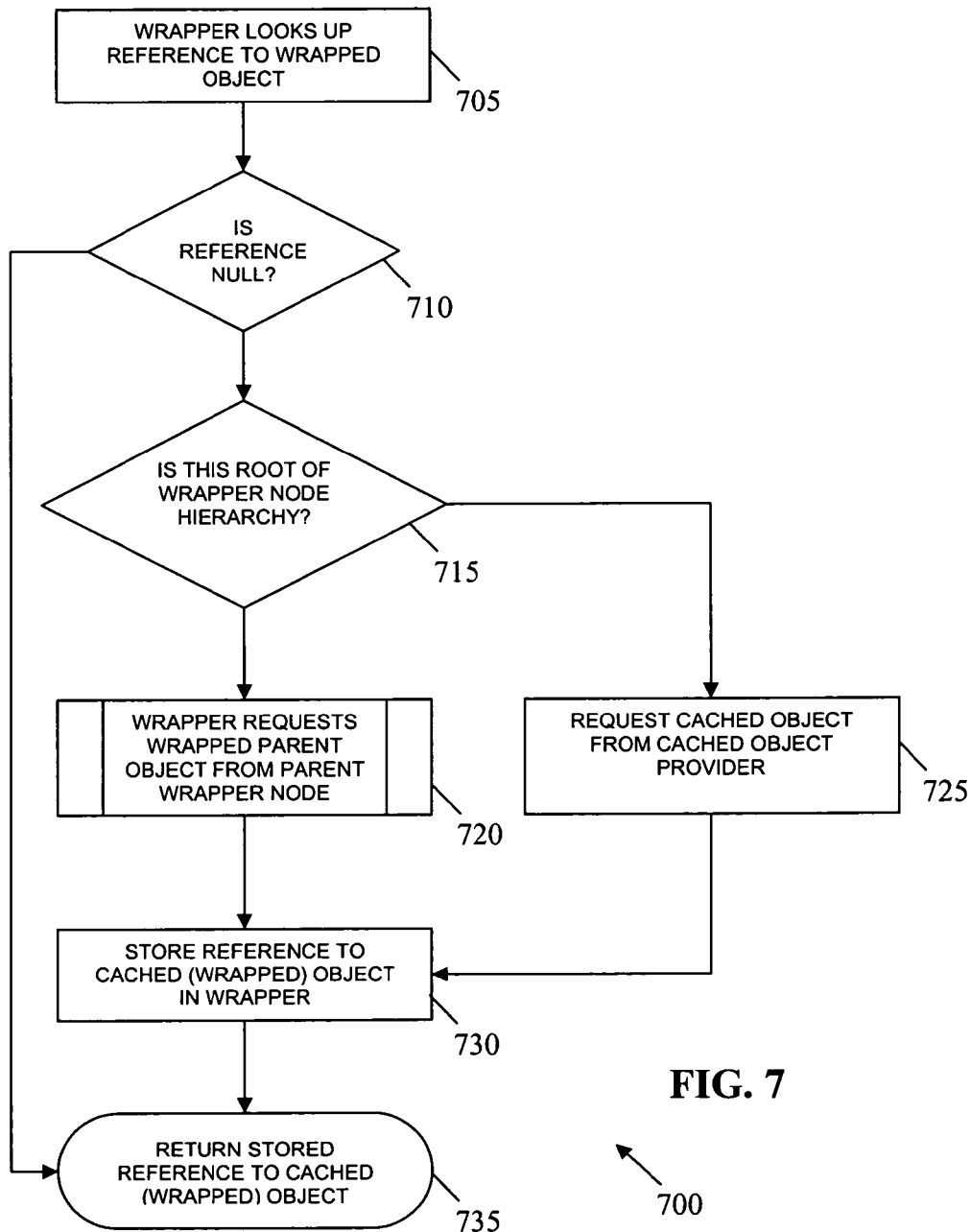
FIG. 7 is a process flow diagram illustrating a technique for requesting a wrapper peer of a wrapper node.

FIG. 7 is a process flow diagram illustrating a method 700 for requesting the wrapped peer of a wrapper node in which, at 705, the wrapper looks up a reference to the wrapped object. If, at 710, it is determined that the reference is not null, then at 735, the stored reference to the cached (wrapped) object is returned. Otherwise, at, 715, it is determined whether the reference refers to the root of the node of the wrapper node hierarchy. If that is the case, then at 725, the cached object is requested from the cached object provider and, at 730, the reference to the cached (wrapped) object is stored in the wrapper, and at 735, the reference is returned. If the reference is not to the root of the node of the wrapper node hierarchy, then at, 720, the wrapper requests the wrapped parent object in the from parent wrapper node before the reference is stored, at 730, and returned at 735.

Figure 8:
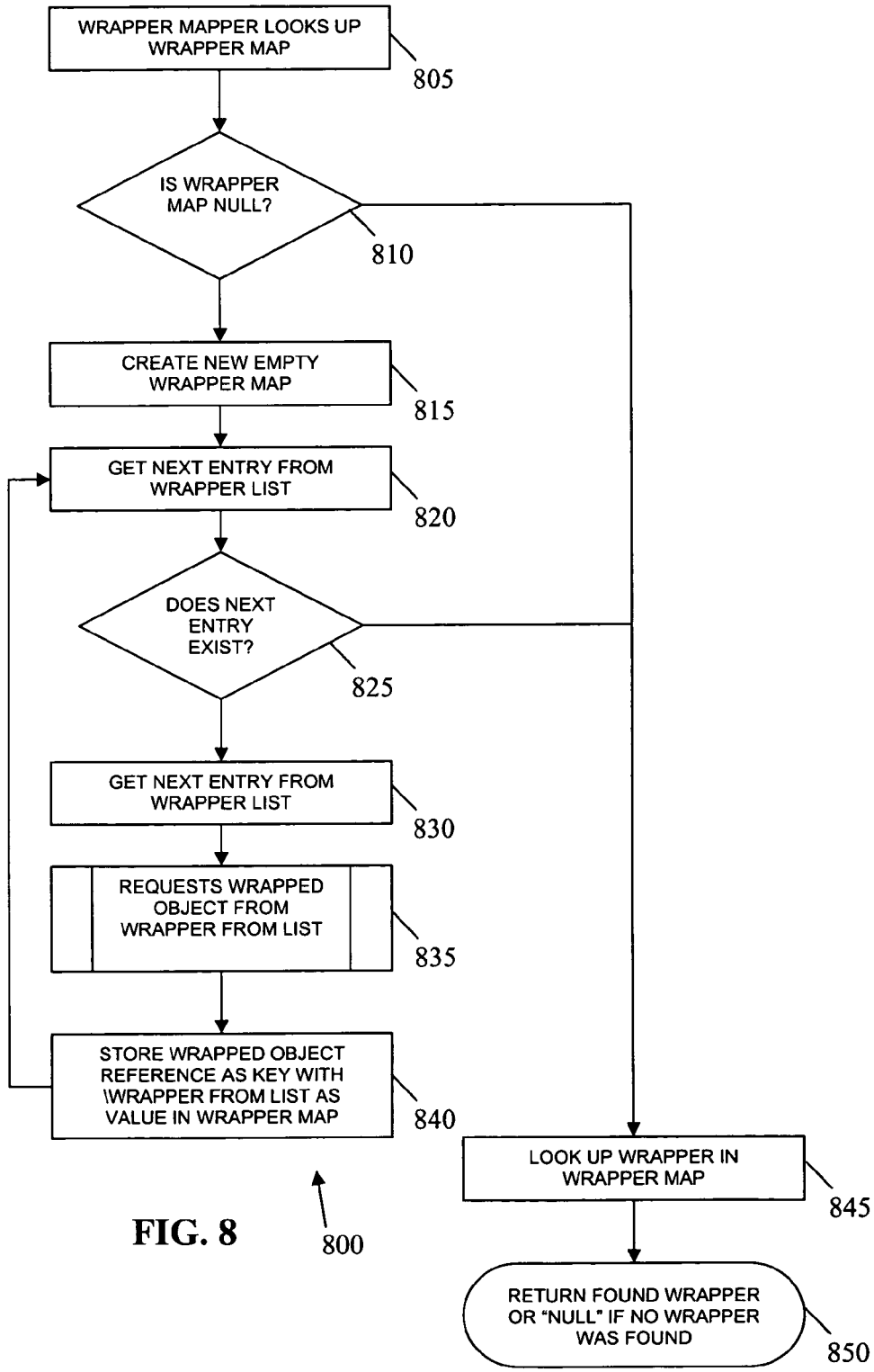
FIG. 8 is a process flow diagram illustrating a technique for requesting a wrapper for a cached object from the wrapper mapper.

FIG. 8 is a process flow diagram illustrating a method 800 for requesting the wrapper for a cached object from the wrapper mapper in which, at 805, the wrapper mapper looks up the wrapper map. It is then determined, at 810, whether the wrapper map is null. If that is not the case, then, at 845, the wrapper is looked up in the wrapper map, so that at 850, the found wrapper is returned or a null indication is retuned if no wrapper was found. If the wrapper map is not null, then at 815, a new empty wrapper map is created, and a recursive operation begins in which, at 820, a next entry is obtained from the wrapper list. Thereafter, at 825, it is determined whether a subsequent entry exists. If that is not the case, then, at 845, the wrapper is looked up in the wrapper map and, at 850, the found wrapper is returned or a null indication is returned if no wrapper was found. If a subsequent entry does exist, then at 830, a next entry is obtained from the wrapper list, and at 835, the wrapped object is requested from the wrapper list (see also FIG. 7). Then, at 840, the wrapped object reference is stored as a key with the wrappers from the list as a value in the wrapper map and the process repeats, at 820, with the next entry in the wrapper list.

Figure 9:
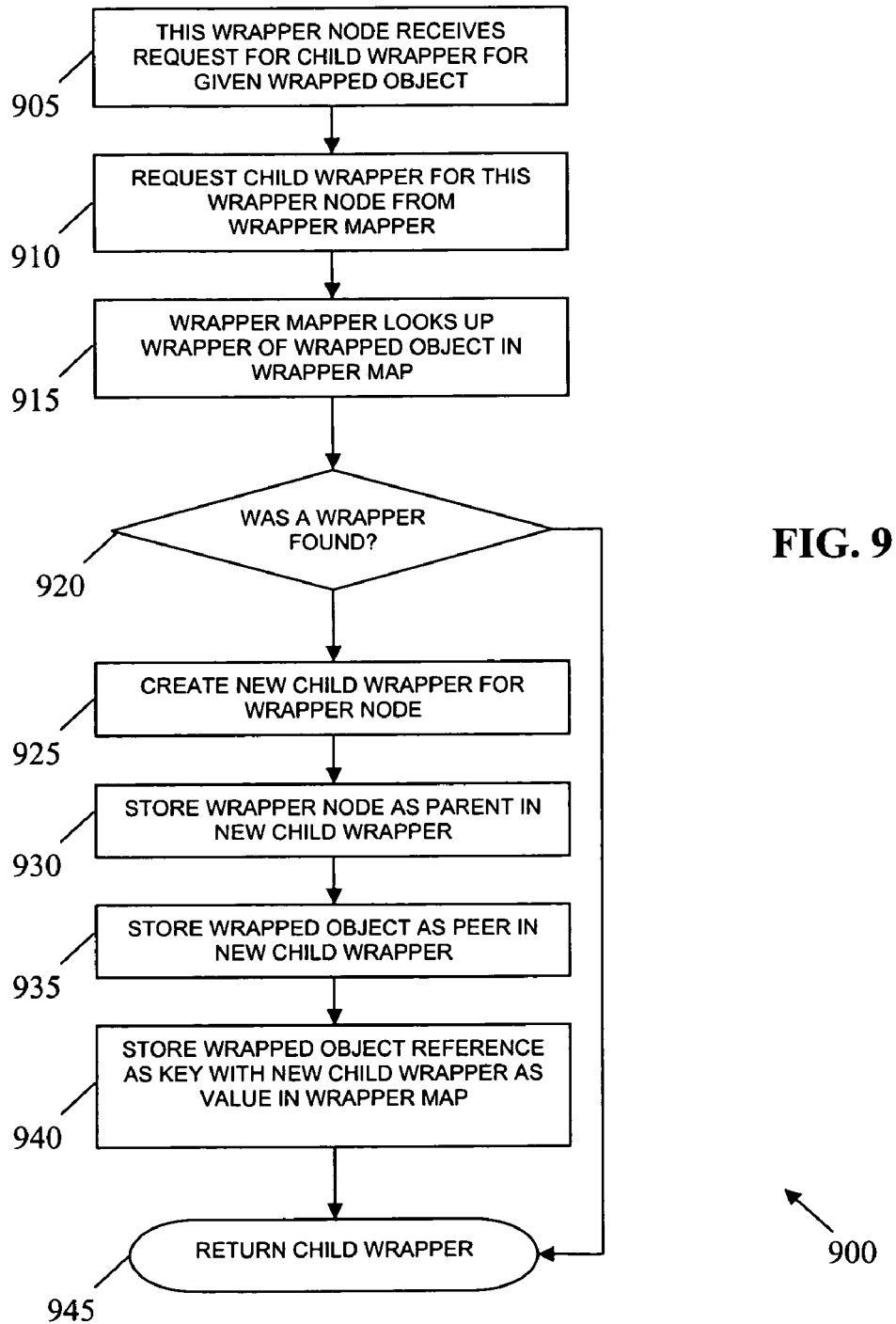
FIG. 9 is a process flow diagram illustrating a technique for requesting a child wrapper from a wrapper node.

FIG. 9 is process flow diagram illustrating a method 900 for requesting a child wrapper from a wrapper node in which, at 905, the wrapper node receives a request for a child wrapper for a given wrapped object. Thereafter, at 910, the child wrapper for the wrapper node is requested from the wrapper mapper so that the wrapper mapper can, at 915, look up the wrapper of the wrapped object in the wrapper map. It is then determined, at 920, whether the wrapper was found. If a wrapper was found, then at 945, the child wrapper is returned. Otherwise, at 925, a new child wrapper for the wrapper node is created and, at 930, the wrapper node is stored as the parent in the new child wrapper. The wrapped object is also stored, at 935, as a peer in the new child wrapper. Additionally, the wrapped object reference, at 940, is stored as a key with the new child wrapper as value in the wrapper map. Afterwards, the child wrapper, at 945, is returned.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for yinteraction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. For example, in the Enterprise Services Framework (ESF) of SAP NetWeaver, large amounts of metadata can be loaded into the memory of a Java application server. The current subject matter significantly lowers overall memory consumption for applications such as Web Dynpro Pattern applications or other ESF applications. In particular, memory consumption is reduced by having wrappers contain two object references and by only creating objects which are being used by an application. In addition, if data has to be fetched from a remote server, maintaining the data in a cross-session cache drastically improves performance by obviating a time consuming remote call. Moreover, the techniques described herein can be used with any object-oriented programming languages as well as other areas in which large amounts of metadata is used that has associated session specific data. Furthermore, the current subject matter allows for references from session data to a cache to be held transient and recovered after a session failover by reconnecting wrappers to their cached peers.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a machine-readable medium encoding instructions that, when executed by at least one data processing apparatus, cause the at least one data processing apparatus to perform operations comprising:
   receiving, by a wrapper, a request for application data, the wrapper storing a first reference to a cross-session object and a second reference to a wrapper mapper object;
   accessing a cross-session object using the first reference; and
   polling the wrapper mapper object using the second reference to access a session-local object, the mapper wrapper object containing a wrapper list referencing the wrapper and any wrappers contained therein to facilitate recovery of the first reference and second reference after a session failover.

2. An article as in claim 1, wherein the polling comprises:
   returning, by the wrapper mapper object, a data object wrapper referencing the session-local object; and
   accessing the session-local object using the data object wrapper.

3. An article as in claim 2, wherein the wrapper list refers to the wrapper and the data object wrapper.

4. An article as in claim 2, wherein the wrapper mapper object comprises a map associating session-local objects with references.

5. An article as in claim 2, wherein the wrapper mapper object comprises a map associating session-local objects with references.

6. An article as in claim 1, wherein the polling comprises:
   determining that a data object wrapper associated with the second reference does not exist;
   generating a data object wrapper storing the session-local object;
   returning, by the wrapper mapper object, the data object wrapper; and
   accessing the session-local object using the data object wrapper.

7. An article as in claim 1, wherein the application data is non-volatile application data.

8. An article as in claim 1, wherein the application data is metadata.

9. An article as in claim 1, wherein the wrapper list is persisted.

10. An article as in claim 1, wherein the wrapper contains a child wrapper, the child wrapper storing a third reference to the wrapper and a fourth reference to a node of the cross-session object.

11. An article as in claim 10, wherein a map references the wrapper and the child wrapper.

12. An article as in claim 10, wherein the fourth reference is provided in response to a request for data associated with the node of the cross-session object.

13. An article comprising a machine-readable medium encoding instructions that, when executed by at least one data processing apparatus, cause the at least one data processing apparatus to perform operations comprising:
   receiving, by a first wrapper, a request for application data, the first wrapper storing a reference to a wrapper mapper object and a second wrapper, the mapper wrapper object containing a wrapper list characterizing the first wrapper and the second wrapper;

polling the wrapper mapper object, by the first wrapper, to retrieve a reference to the cross-session object, the application data being associated with a node of the cross-session object;

updating the first wrapper to include the reference to the session local object;

rebuilding a wrapper mapper object map using the wrapper list, the wrapper mapper object map associating the first wrapper with the session-local object and the second wrapper with the node of the cross-session object; and updating the second wrapper with a reference to the node of the cross-session object using the wrapper mapper object map to enable a return of the reference to the node of the cross-session object in response to requests for data associated with the node of the cross-session object.

14. An article as in claim 13, wherein the application data is non-volatile application data.

15. An article as in claim 13, wherein the application data is metadata.

16. An article as in claim 13, wherein the wrapper list is persisted.

17. An article comprising a machine-readable medium encoding instructions that, when executed by at least one data processing apparatus, cause the at least one data processing apparatus to perform operations comprising:

receiving, by a wrapper mapper object, a request for data contained in a business object;

retrieving a reference to the business object;

generating a first wrapper containing a first reference to the business object and a second reference to the wrapper mapper object;

storing the first reference to the business object and a third reference to the first wrapper in a map within the wrapper mapper object;

storing the third reference to the first wrapper in a wrapper list within the wrapper mapper object;

returning a reference to the first wrapper in response to the request;

receiving, by the first wrapper, a request for data associated with a node of the business object;

requesting, by the first wrapper from the wrapper mapper object, the data being associated with the node of the business object;

generating a second wrapper within the first wrapper containing a fourth reference to the node of the business object and a fifth reference to the first wrapper;

storing the fourth reference to the node of the business object and a fifth reference to the second wrapper in the map within the wrapper mapper object; and storing the fifth reference to the second wrapper in the wrapper list to enable a return of the fourth reference in response to requests for the data associated with the node of the business object.

18. An article as in claim 17, wherein the data is non-volatile application data.

19. An article as in claim 17, wherein the data is metadata.

20. An article as in claim 17, wherein the wrapper list is persisted.

* * * * *